(12) United States Patent
Makino et al.

(10) Patent No.: US 7,763,998 B2
(45) Date of Patent: Jul. 27, 2010

(54) STATOR

(75) Inventors: Takashi Makino, Kosai (JP); Atsushi Fujiyama, Toyohashi (JP)

(73) Assignee: ASMO Co., Ltd. (JP)

( * ) Notice: Subject to any disclaimer, the term of this patent is extended or adjusted under 35 U.S.C. 154(b) by 660 days.

(21) Appl. No.: 11/670,722

(22) Filed: Feb. 2, 2007

(65) Prior Publication Data
US 2007/0182265 A1 Aug. 9, 2007

(30) Foreign Application Priority Data

| Feb. 3, 2006 | (JP) | ............................. | 2006-027701 |
| Apr. 25, 2006 | (JP) | ............................. | 2006-121132 |
| Apr. 25, 2006 | (JP) | ............................. | 2006-121133 |
| Apr. 28, 2006 | (JP) | ............................. | 2006-125907 |

(51) Int. Cl.
H02K 11/00 (2006.01)
(52) U.S. Cl. ...................................................... 310/71
(58) Field of Classification Search .................. 310/71, 310/260, 270
See application file for complete search history.

(56) References Cited

U.S. PATENT DOCUMENTS

| 5,519,271 A | * | 5/1996 | Sakashita et al. ............... 310/71 |
| 6,091,172 A | * | 7/2000 | Kakinuma et al. ............ 310/71 |
| 6,127,760 A | * | 10/2000 | Nagasaki et al. ...... 310/216.074 |
| 6,333,579 B1 | * | 12/2001 | Hirano et al. ................ 310/194 |
| 6,924,570 B2 | * | 8/2005 | De Filippis et al. ........... 310/71 |

FOREIGN PATENT DOCUMENTS

| JP | 11-55883 | 2/1999 |
| JP | 2005-269875 | 9/2005 |

* cited by examiner

Primary Examiner—Dang D Le
(74) Attorney, Agent, or Firm—Sheridan Ross P.C.

(57) ABSTRACT

A connecting wire extends from a first tooth to a second tooth so as to connect a plurality of coils. An extension portion is provided to an insulator so as to extend in the axial direction. The extension portion has a distal end in the axial direction, a proximal end, notches which extend from the distal end to the proximal end, and a radially outer surface. The connecting wire extends from the first tooth and is positioned by the bottom surface and the side surfaces of a notch. The connecting wire is led out from the notch in the radial direction of the extension portion, and arranged along the radially outer surface so as to run toward the second tooth. Accordingly, the connecting wire can be arranged with ease.

16 Claims, 13 Drawing Sheets

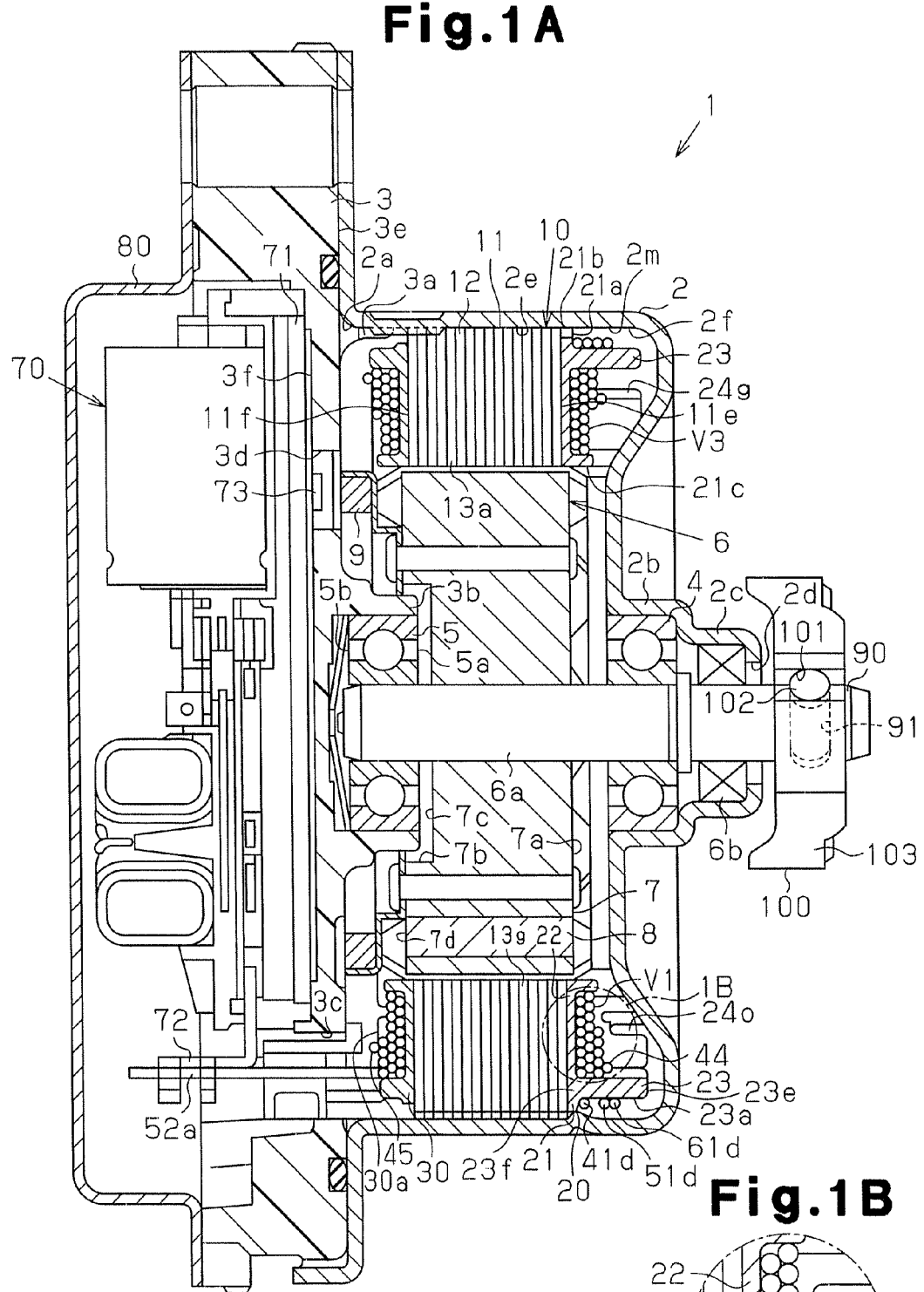
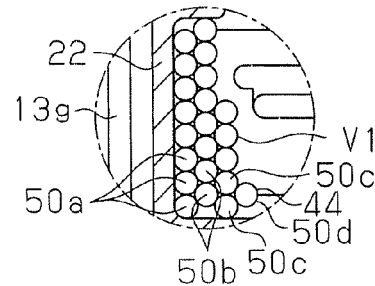

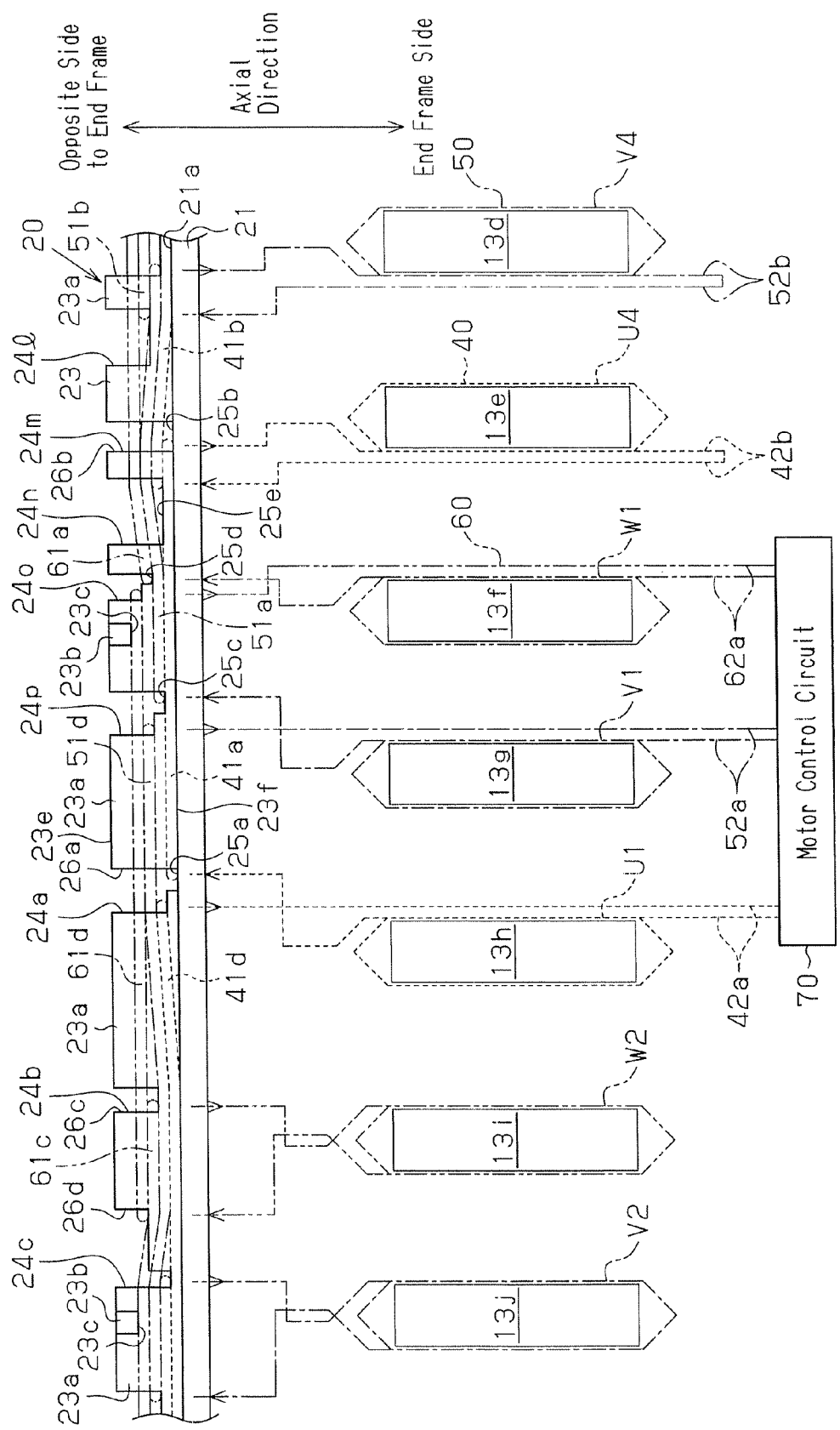

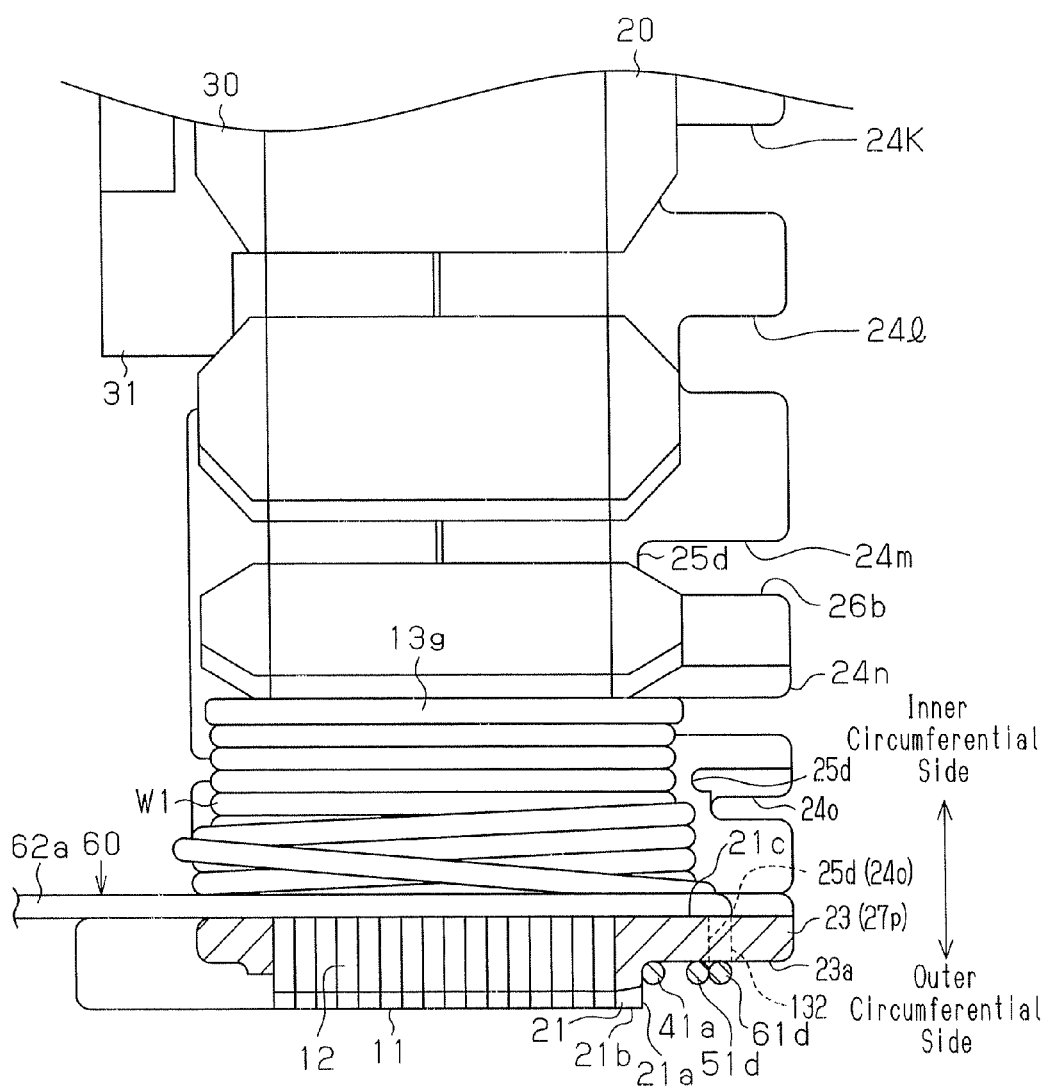

STATOR

BACKGROUND OF THE INVENTION

The present invention relates to a stator.

Japanese Laid-Open Patent Publication 11-55883 discloses a stator which is used for a brushless motor. A plurality of outer circumferential grooves are created so as to extend in the circumferential direction on the outer circumferential surface of an insulator which is attached to this stator. A plurality of connecting wires are contained in the respective corresponding outer circumferential grooves. Each connecting wire connects a coil to another coil.

It is troublesome, however, to contain the connecting wires in the respective corresponding outer circumferential grooves, and it is also difficult to set the location of the connecting wires.

SUMMARY OF THE INVENTION

An objective of the present invention is to provide a stator that permits connecting wires to be easily arranged.

According to one aspect of the present invention, a stator having a stator core, an insulator and a plurality of coils is provided. The stator core has an annular portion which defines the axial direction and a plurality of teeth which extend from this annular portion to the inside in the radial direction. The insulator has an annular coating portion which coats the annular portion and a plurality of tooth coating portions which extend from the annular coating portion to the inside in the radial direction so as to coat the respective teeth. Each coil is formed of a lead wire which is wound around each tooth in such a state that the coils are separated from the teeth by the tooth coating portions. The teeth include a first tooth and a second tooth around which a lead wire is wound after being wound around the first tooth. The connecting wires include portions of a lead wire which extends from the first tooth to the second tooth, so that the coils are connected. An extension portion is provided to the annular coating portion so as to extend in the axial direction. The extension portion has an end in the axial direction, a proximal end, notches which extend from the distal end to the proximal end, bottom surfaces and side surfaces for defining the notches, and an outer surface in the radial direction. A connecting wire extends from the first tooth and is positioned by the bottom surface and the side surfaces. The connecting wire is led from the notch toward the outside of the extension portion in the radial direction, and is arranged sol as to be directed toward the second tooth along the outer surface in the radial direction.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1A is a longitudinal cross-sectional view showing a brushless motor according to the first embodiment of the present invention;

FIG. 1B is a partially enlarged view of FIG. 1A;

FIG. 6 is a development for illustrating the arrangement of the connecting wires shown in FIG. 4;

FIG. 8 is a cross-sectional view showing a portion of the stator shown in FIG. 7A as viewed from the direction of arrow VIII;

DETAILED DESCRIPTION OF THE PREFERRED EMBODIMENTS

Figure 2:
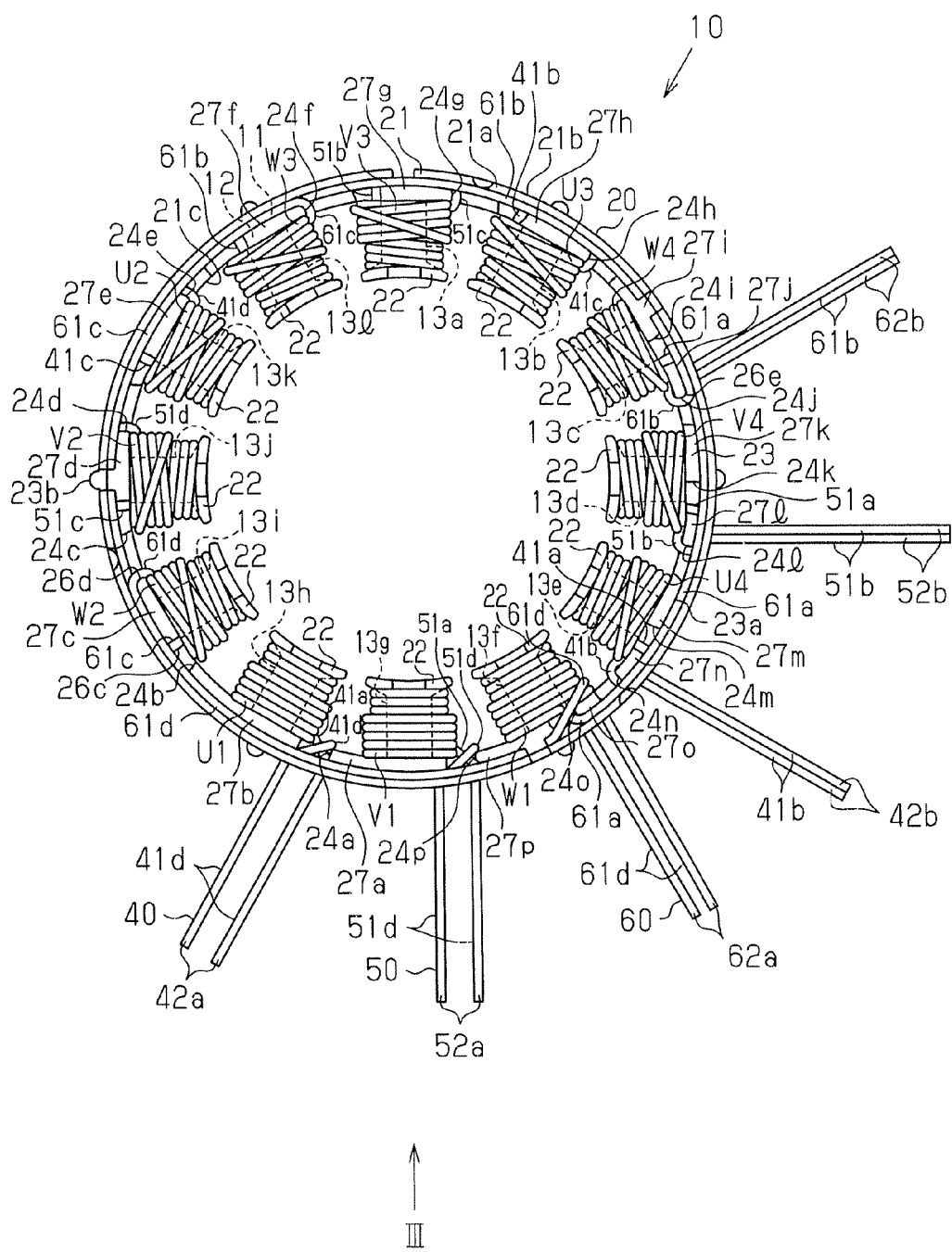
FIG. 2 is a front view showing the stator shown in FIG. 1A as viewed from the right in FIG. 1A.

In the following, a first embodiment of the present invention is described in reference to FIGS. 1A to 6.

FIG. 1A shows an inner rotor type brushless motor 1 according to the first embodiment. The brushless motor 1 has a housing 2 in the form of a cylinder having a bottom, a stator 10 in cylindrical form which is press fitted in the housing 2, and a rotor 6 which is contained inside the stator 10 in the radial direction in such a manner as to be rotatable. The stator 10 makes contact with the cylindrical wall 2e of the housing 2. The stator 10 faces the outer circumferential surface of the rotor core 7.

An opening 2a of the housing 2 is closed by an end frame 3. The end frame 3 has an engaging portion which engages with the opening 2a from the inside. The end frame 3 has a first surface 3e which faces the stator 10 and a second surface 3f which faces the direction opposite to the stator 10.

As shown in the right in FIG. 1A, a first containing portion 2b for containing a first bearing 4 is provided in the center portion at the bottom of the housing 2. A second containing portion 3b for containing a second bearing 5 is provided in the center portion of the end frame 3. The second containing portion 3b is formed of an annular wall.

The bottom of the housing 2 and the first bearing 4 are located on the right in FIG. 1A. The end frame 3 and the second bearing 5 are located on the left in FIG. 1A.

The rotor 6 has a rotary shaft 6a and a rotor core 7 which is fixed to this rotary shaft 6a. The first bearing 4 and the second bearing 5 support the rotary shaft 6a of the rotor 6 so that the shaft is rotatable. The rotary shaft 6a is secured to the inner ring of the first bearing 4 and the inner ring of the second bearing 5. A recess portion 2c for containing an oil seal 6b is formed in the center portion on the bottom of the first containing portion 2b. A through hole 2d is created at the bottom of the recess portion 2c. The rotary shaft 6a penetrates through the through hole 2d and protrudes out of the housing 2. The oil seal 6b seals the gap between the housing 2 and the rotary shaft 6a.

The rotor core 7 has a first end surface 7a directed toward the first bearing 4 and a second end surface 7d directed toward the second bearing 5. The first end surface 7a is positioned so as to be directed to the right in FIG. 1A, that is to say, toward the bottom of the housing 2. The first end surface 7a is directed to the side opposite to the end frame 3. The second end surface 7d is positioned so as to be directed to the left in FIG. 1A, that is to say, toward the end frame 3. The axis line of the rotor core 7 agrees with the axis line of the rotary shaft 6a.

The rotor core 7 includes a plurality of core sheets which are layered on top of each other. A plurality of permanent magnets 8 are embedded in the rotor core 7 as rotor magnets. A containing recess 7b for containing the second bearing 5 and the second containing portion 3b is provided on the second end surface 7d of the rotor core 7. That is to say, the bottom 7c of the containing recess 7b has a diameter which is greater than the second containing portion 3b. The end surface 5a on the opposite to the end frame 3 of the second bearing 5 is located between the first end surface 7a and the second end surface 7d. That is to say, the rotor core 7 and the second bearing 5 overlap as viewed from the outside in the radial direction. Accordingly, the brushless motor is more compact in the axial direction.

A sensor magnet 9 in ring form is attached to the second end surface 7d of the rotor core 7. The sensor magnet 9 has N poles and S poles which are alternately provided at predetermined angles.

As shown in FIG. 2, the stator 10 is provided with a stator core 11 in cylindrical form. The stator core 11 has an annular portion 12 and twelve teeth 13a to 13l which extend inward from the inner circumferential surface of this annular portion 12 in the radial direction. As shown in FIG. 1A, the annular portion 12 and the teeth 13a to 13l are formed integrally.

FIG. 2 shows the stator 10 as viewed from the right in FIG. 1A. The first tooth 13a is located at the top in FIG. 2. Starting from the first tooth 13a, the second tooth 13b, the third tooth 13c, . . . , and the twelfth tooth 13l are arranged clockwise in this order.

The annular portion 12 is arranged along the inner circumferential surface 2f of the housing 2. The teeth 13a to 13l are arranged at equal angle intervals in the circumferential direction; concretely, at intervals of 30°. The stator core 11 has a first end surface 11e on the side opposite to the end frame 3 and a second end surface 11f directed toward the end frame 3.

Figure 3:
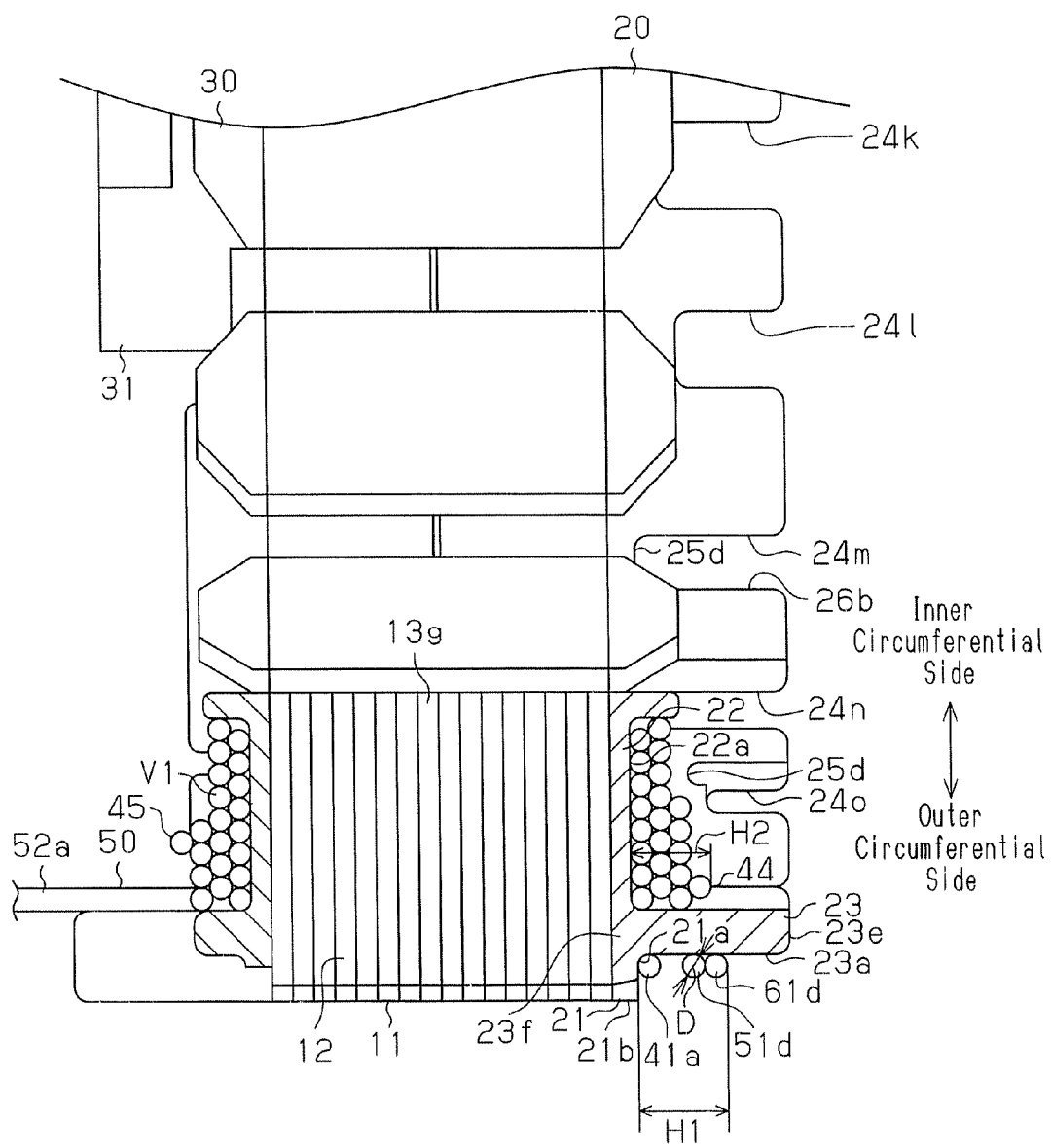
FIG. 3 is a cross-sectional view showing a portion of the stator shown in FIG. 2 as viewed from the direction of arrow III.

As shown in FIGS. 1A and 3, the teeth 13a to 13l are coated with one first insulator 20, shown at the right in FIGS. 1A and 3, and one second insulator 30, shown at the left in FIG. 1A and 3. The first insulator 20 is located on the first end surface 11e. The second insulator 30 is located on the second end surface 11f. The second insulator 30 has a second surface 30a directed toward the end frame 3.

Figure 4:
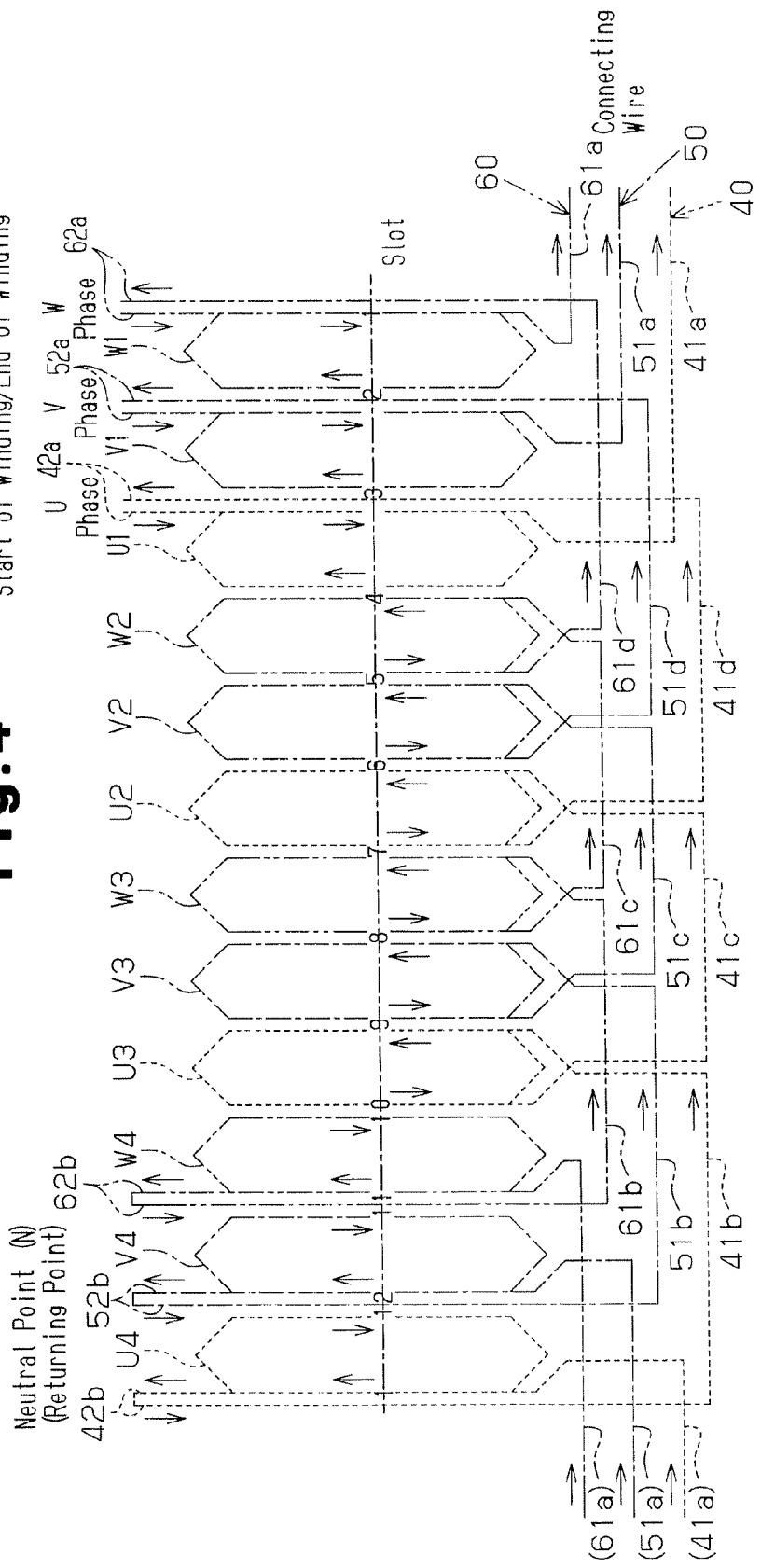
FIG. 4 is a development for illustrating the arrangement of the lead wire as viewed from the inside in the radial direction of the stator shown in FIG. 1A.

As shown in FIGS. 2 and 4, lead wires 40, 50 and 60 are wound around the above described teeth 13a to 13l in such a state as to be respectively coated with the first insulator 20 and the second insulator 30 in the form of concentrated winding. As a result, twelve coils U1 to U4, V1 to V4, and W1 to W4 are formed. The lead wires 40 to 60 are respectively coated with an insulating coating film and insulated from each other. The respective coils U1 to W4 have a first coil end 44 on the side opposite to the end frame 3 and a second coil end 45 directed toward the end frame 3. In other words, the first coil end 44 is the end of the coils U1 to W4 in the axial direction.

As shown in FIG. 2, the first lead wire 40 shows one phase; concretely, the U phase. The first lead wire 40 forms the first coil U1 around the eighth tooth 13h, the second coil U2 around the eleventh tooth 13k, the third coil U3 around the second tooth 13b and the fourth coil U4 around the fifth tooth 13e. Likewise, the second lead wire 50 which shows another phase; that is, the V phase, forms the fifth coil V1 around the seventh tooth 13g, the sixth coil V2 around the tenth tooth 13j, the seventh coil V3 around the first tooth 13a and the eighth coil V4 around the fourth tooth 13V. Likewise, the third lead wire 60 which shows still another phase; that is, the W phase, forms the ninth coil W1 around the sixth tooth 13f, the tenth coil W2 around the ninth tooth 13i, the eleventh coil W3 around the twelfth tooth 13l and the twelfth coil W4 around the third tooth 13c.

As shown in FIG. 2, the coil W1 is wound around the sixth tooth 13f. Starting from the coil W1, the coils W1, V1, U1, W2, V2, U2, W3, V3, U3, W4, V4 and U4 are aligned clockwise in this order.

As shown in FIGS. 1A and 2, the first insulator 20 has one annular coating portion 21 and a plurality of tooth coating portions 22 for coating the teeth 13a to 13l. The respective tooth coating portions 22 extend inward from this annular coating portion 21 in the radial direction. The respective tooth coating portions 22 are formed integrally with the annular coating portion 21.

The annular coating portion 21 coats the annular portion 12 of the stator core 11. The annular coating portion 21 has a support surface 21a facing the direction opposite to the stator core 11. The support surface 21a functions as a support surface crossing the axial direction so as to support the lead wires 40 to 60. Concretely, the support surface 21a is vertical to the axial direction. The support surface 21a is directed in the direction opposite to the end frame 3, that is to say, to the right in FIG. 1A. The annular coating portion 21 has a base outer circumferential surface 21b which is the outer circumference of the first insulator 20.

As shown in FIGS. 1A and 1B, in the cross section of each of the coils U1 to U4, V1 to V4 and W1 to W4, the respective lead wires 40 to 60 are layered like stacked barrels. The coil V1, for example, is formed of the lead wire 50 around the tooth 13g; to be precise, around the tooth coating portion 22. The tooth coating portion 22 has a coil supporting surface 22a which crosses the axial direction. The coil supporting surface 22a faces the direction opposite to the end frame 3 and is vertical to the axial direction.

The coil V1 includes the first layer 50a, the second layer 50b, the third layer 50c, and the fourth layer 50d, which are layered in this order starting from the coil supporting surface 22a. The first layer 50a is aligned along the coil supporting surface 22a. The second layer 50b is located outside the first layer 50a, that is to say, to the right in FIG. 1A. The second layer 50b is placed in such a manner as to be engaged in recesses between circular cross sections of lead wires 50 in the first layer 50a. Likewise, the third layer 50c is located outside the second layer 50b. The third layer 50c, wires are engaged in recesses between circular cross sections of lead wires 50 in the second layer 50b.

Figure 5:
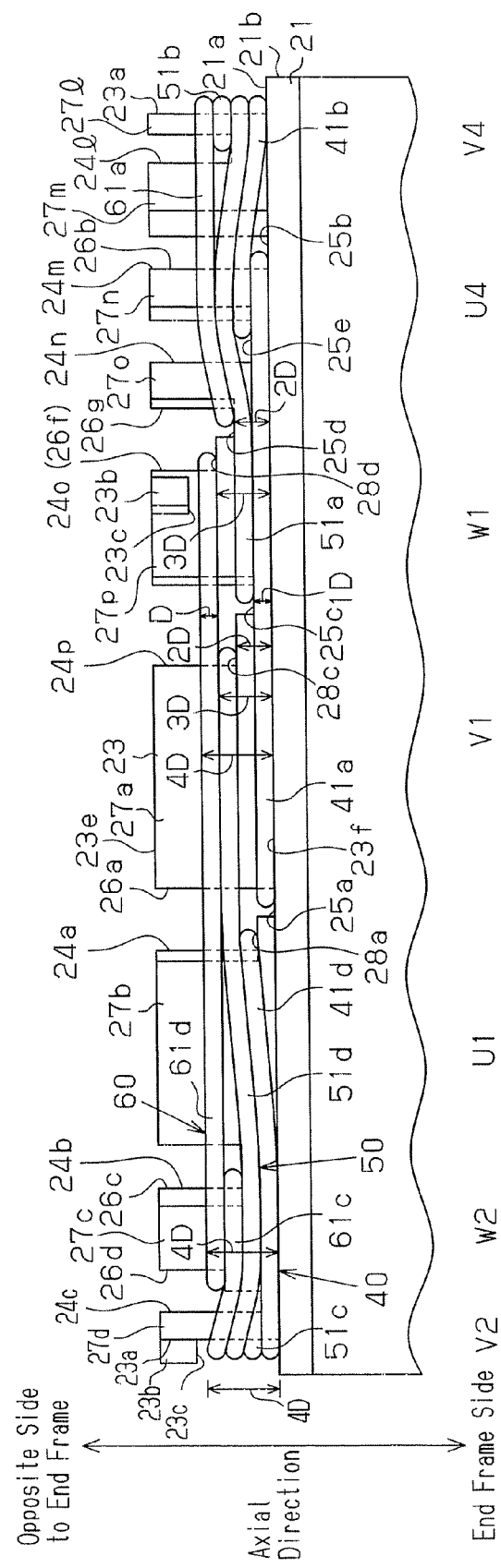
FIG. 5 is a side view showing connecting wires of which the left and right are reversed as those shown in FIG. 1A, that is to say, a side view showing connecting wires as viewed from the direction of arrow A in FIG. 2.

As shown in FIGS. 1A, 5 and 6, the first insulator 20 has an extension portion 23 in cylindrical form which extends from the annular coating portion 21 in the axial direction. The extension portion 23 forms a concentric circle with the annular coating portion 21. The extension portion 23 extends from the support surface 21a in the direction opposite to the end frame 3. The extension portion 23 has a distal end 23e in the axial direction and a proximal end 23f which is located on the support surface 21a. In FIGS. 5 and 6, the extension portion 23 extends upward.

The support surface 21a is located outside the extension portion 23 in the radial direction. The extension portion 23 is located inside the base outer circumferential surface 21b at a distance which is greater than the diameter D of the lead wires 40 to 60 in the radial direction. That is to say, the guide outer circumferential surface 23a, which is the radially outer surface of the extension portion 23, is located inside the base outer circumferential surface 21b in the radial direction. The guide outer circumferential surface 23a is parallel to the axial direction and vertical to the support surface 21a.

As shown in FIGS. 2, 3, 5, and 6, a plurality of notches 24a to 24p; concretely, 16 notches, are created in the extension portion 23.

As shown in FIG. 2, the first notch 24a is located between the seventh tooth 13g and the eighth tooth 13h. That is to say, the first notch 24a is located between the first coil U1 and the fifth coil V1. Starting from the first notch 24a, sixteen notches 24a, 24b, 24c, 24d, 24e, 24f, 24g, 24h, 24i, 24j, 24k, 24l, 24m, 24n, 24o and 24p are aligned clockwise in this order.

The notches 24a to 24p extend from the distal end 23e of the extension portion 23 toward the proximal end 23f. That is to say, the extension portion 23 has sixteen engaging protrusions 27a to 27p which separate the sixteen notches 24a to 24p. The respective engaging protrusions 27a extend in the axial direction toward the side opposite to the end frame 3. In some cases, the notches 24a to 24p are generalized to "notch 24." In some cases, the engaging protrusions 27a to 27p are generalized to "engaging protrusion 27."

The first engaging protrusion 27a and the second engaging protrusion 27b define the first notch 24a in between. The second engaging protrusion 27b and the third engaging protrusion 27c have the second notch 24b in between. That is to say, in FIG. 2, sixteen engaging protrusions 27a, 27b, 27c, 27d, 27e, 27f, 27g, 27h, 27i, 27j, 27k, 27l, 27m, 27n, 27o and 27p are aligned clockwise in this order.

The extension portion 23 has sixteen bottoms for defining sixteen notches 24a to 24p and thirty two side surfaces 26. One bottom and two side surfaces 26 define one notch 24. One bottom has at least one bottom surface 25. "Bottom surface 25" is a generalized way of referring to a plurality of bottom surfaces. "Side surface 26" is a generalized way of referring to a plurality of side surfaces.

As shown in FIGS. 2 and 4, the lead wires 40, 50 and 60 have first terminals 42a, 52a and 62a, and second terminals 42b, 52b and 62b on the opposite side, respectively. The first terminals 42a to 62a are connected to a control circuit 70. The second terminals 42b to 62b are connected to neutral points N, which are the midway points of the lead wires 40 to 60. The first terminals 42a to 62a and the second terminals 42b to 62b are placed in the end frame 3. Arrows in FIG. 4 indicate the direction in which the lead wires 40 to 60 are winded.

As shown in FIG. 4, the first terminal 42a is a portion of the first lead wire 40 between the first coil U1 and the second coil U2. The first terminal 52a is a portion of the second lead wire 50 between the fifth coil V1 and the sixth coil V2. The first terminal 62a is a portion of the third lead wire 60 between the ninth coil W1 and the tenth coil W2.

The second terminal 42b is a portion of the first lead wire 40 between the fourth coil U4 and the third coil U3. The second terminal 52b is a portion of the second lead wire 50 between the eighth coil V4 and the seventh coil V3. The second terminal 62b is a portion of the third lead wire 60 between the twelfth coil W4 and the eleventh coil W3.

The lead wire 40 includes connecting wires 41a to 41d. The lead wire 50 includes connecting wires 51a to 51d. The lead wire 60 includes connecting wires 61a to 61d. The connecting wires 41a to 41d, 51a to 51d, and 61a to 61d respectively function as portions of the lead wires 40, 50 and 60 which extend from the first coil to the second coil from among the corresponding pairs of coils U1 to U4, V1 to V4, and W1 to W4.

As shown in FIG. 4, the first connecting wire 41a extends from the first coil U1 to the fourth coil U4. That is to say, the first connecting wire 41a extends from the eighth tooth 13h corresponding to the first coil U1 to the fifth tooth 13e corresponding to the fourth coil U4. That is to say, the lead wire 40 is wound around the eighth tooth 13h and then around the fifth tooth 15e. In terms of the first connecting wire 41a, the eighth tooth 13h corresponds to the first tooth in the claims. In terms of the first connecting wire 41a, the fifth tooth 13e corresponds to the second tooth in the claims.

The second connecting wire 41b extends from the fourth coil U4 to the third coil U3. The third connecting wire 41c extends from the third coil U3 to the second coil U2. The fourth connecting wire 41d extends from the second coil U2 to the first coil U1.

The fifth connecting wire 51a extends from the fifth coil V1 to the eighth coil V4. The sixth connecting wire 51b extends from the eighth coil V4 to the seventh coil V3. The seventh connecting wire 51c extends from the seventh coil V3 to the sixth coil V2. The eighth connecting wire 51d extends from the sixth coil V2 to the fifth coil V1.

The ninth connecting wire 61a extends from the ninth coil W1 to the twelfth coil W4. The tenth connecting wire 61b extends from the twelfth coil W4 to the eleventh coil W3. The eleventh connecting wire 61c extends from the eleventh coil W3 to the tenth coil W2. The twelfth connecting wire 61d extends from the tenth coil W2 to the ninth coil W1.

The bottom surface 25 and the side surfaces 26 function as an engaging portion for positioning the connecting wires 41a to 61d. The connecting wires 41a to 61d are positioned by the bottom surface 25 and the side surfaces 26, and thus, are led out from inside the extension portion 23 in the radial direction. The connecting wires 41a to 61d which are led out from the extension portion 23 in the radial direction run between the support surface 21a and the guide outer circumferential surface 23a.

As shown in FIG. 5, the first connecting wire 41a runs along the guide outer circumferential surface 23d from the eighth tooth 13h corresponding to the first coil U1 to the fifth tooth 13e corresponding to the fourth coil U4, so that the first coil U1 is connected to the fourth coil U4. The first connecting wire 41a passes through the first notch 24a from the fourth coil U4, which is located inside the extension portion 23 in the radial direction, and thus, is led out from the extension portion 23 in the radial direction.

The first connecting wire 41a extends in the circumferential direction along the guide outer circumferential surface 23d and the support surface 21d so as to connect the first engaging protrusion 27a, the sixteenth engaging protrusion 27p, the fifteenth engaging protrusion 27o and the fourteenth engaging protrusion 27n. That is to say, the first connecting wire 41a is led out from inside the extension portion 23 in the radial direction, and runs along the guide outer circumferential surface 23a. The first connecting wire 41a passes through the thirteenth notch 24m, and thus, is drawn into the extension portion 23 from the outside in the radial direction so as to extend toward the first coil U1.

The bottom of the first notch 24a is in step form and has a first bottom surface 25a and an eleventh bottom surface 28a which is closer to the distal end 23e than the first bottom surface 25a. The distance between the first bottom surface 25a and the eleventh bottom surface 28a is equal to the diameter D of the lead wires 40 to 60. The bottom of the thirteenth notch 24m is flat and has a second bottom surface 25b. The first bottom surface 25a and the second bottom surface 25b are in the same plane as the support surface 21a. The first bottom surface 25a and the second bottom surface 25b position the first connecting wire 41a in terms of the axial direction. The eleventh bottom surface 28a positions the fourth connecting wire 41d in terms of the axial direction.

The first engaging protrusion 27a has a first side surface 26a which is directed toward the first notch 24a. The fourteenth engaging protrusion 27n has a second side surface 26b which is a side surface directed toward the thirteenth notch 24m. The first side surface 26a and the second side surface 26b position the first connecting wire 41a in terms of the circumferential direction.

Likewise, the eleventh connecting wire 61c passes through the second notch 24b, and thus, is drawn into the extension portion 23 from the outside in the radial direction, and is connected to the tenth coil W2. The twelfth connecting wire 61d extends from the tenth coil W2 and passes through the third notch 24c, and thus, is led out from inside the extension portion 23 in the radial direction.

The third engaging protrusion 27c has a third side surface 26c directed toward the second notch 24b and the fourth side surface 26d directed toward the third notch 24c. The third side surface 26c engages with the eleventh connecting wire 61c in the circumferential direction. The fourth side surface 26d engages with the twelfth connecting wire 61d in the circumferential direction.

As shown in FIG. 2, the third side surface 26c is placed at the proximal end of the side surface of the ninth tooth 13i corresponding to the tenth coil W2. The fourth side surface 26d is placed at the proximal end of the side surface of the tenth coil W2. Therefore, it is easy to start winding the tenth coil W2 which is connected to the eleventh connecting wire 61c around the ninth tooth 13i. In addition, it is easy to lead the twelfth connecting wire 61d which extends from the tenth coil W2 out from the extension portion 23 in the radial direction after finishing winding it around the ninth tooth 13i. Thus, the distance between the third side surface 26c and the tooth 13i in the circumferential direction is smaller than the distance between the fourth side surface 26d and the tooth 13i in the circumferential direction.

That is to say, as shown in FIGS. 2 and 6, the side surface 26 of each notch 24a to 24p is placed so as to correspond to the point where winding of the coils U1 to W4 around each tooth 13a to 13l starts and the point where winding finishes. That is to say, the side surface 26 for positioning the connecting wires 41a to 61d and starting winding of the coils U1 to W4 is placed at the proximal end on the side surface of the tooth 13. The side surface 26 for positioning the connecting wires 41a to 61d which extend from the end of winding of the coils U1 to W4 is placed at the proximal end on the side surface of the coils U1 to W4.

The tenth engaging protrusion 27j has a fifth side surface 26e in the tenth notch 24j. The tenth connecting wire 61b is bent at the tenth notch 24j to an angle which exceeds 90°. The sixth connecting wire 51b is bent at the twelfth notch 24i to an angle which exceeds 90°. The fourth connecting wire 41b is bent at the fourteenth notch 24n to an angle which exceeds 90°.

In detail, the tenth connecting wire 61b is bent within a plane which is vertical to the axial direction to an angle which exceeds 90°. The fifth side surface 26e is at a distance from the side surface of the twelfth coil W4 in the circumferential direction. Accordingly, the tenth connecting wire 61b extends from the twelfth coil W4 to the tenth notch 24j in the circumferential direction, and is bent around the fifth side surface 26e by 180°, and thus, passes through the tenth notch 24j and extends along the guide outer circumferential surface 23a.

In other words, the fifth side surface 26e bends the tenth connecting wire 61b by 180°, which returns from the direction toward the outside of the tenth notch 24j in the radial direction to the direction toward the inside, and thus, engages with the tenth connecting wire 61b in the circumferential direction and the radial direction.

In contrast, the twelfth connecting wire 61d, for example, bends at the third notch 24c to an angle of no greater than 90°. The direction between the fourth side surface 26d and the ninth tooth 13i in the circumferential direction is approximately equal to the distance between the side surface of the tenth coil W2 and the ninth tooth 13i in the circumferential direction. Accordingly, the twelfth connecting wire 61d is bent by 90° from a state of extending in the axial direction to the direction toward the outside in the radial direction after finishing winding of the tenth coil W2, and thus, passes through the third notch 24c. The twelfth connecting wire 61d is bent by 90° from a state of extending in the radial direction to the circumferential direction, and thus, is placed along the guide outer circumferential surface 23a. Accordingly, the twelfth connecting wire 61d is bent at the third notch 24c to an angle of no greater than 90°.

As shown in FIGS. 5 and 6, the location of the bottom surface 25 relative to the axial direction is set in accordance with the location of the connecting wires 41a to 61d. In other words, the location of the bottom surface 25 relative to the direction in which the extension portion 23 extends is set in accordance with the location where the connecting wires 41a to 61d cross on the guide outer circumferential surface 23d.

The bottom of the sixteenth notch 24p is in step form and has a third bottom surface 25c and a thirteenth bottom surface 28c which is closer to the distal end 23e than this third bottom surface 25c by the diameter D. The bottom of the fifteenth notch 24o is in step form and has a fourth bottom surface 25d and a fourteenth bottom surface 28d which is closer to the distal end 23e than this fourth bottom surface 25d by the diameter D. The third bottom surface 25c is closer to the distal end 23e than the support surface 21a by the diameter D. The fourth bottom surface 25d is closer to the distal end 23e than the support surface 21a by a distance that is two times longer than the diameter D, that is to say, 2D.

As shown in FIGS. 5 and 6, the third bottom surface 25c positions the fifth connecting wire 51a which extends from the eighth coil V4 to the fifth coil V1. Accordingly, the fifth connecting wire 51a is positioned at a location at the distance of the diameter D from the support surface 21a. The fourth bottom surface 25d positions the ninth connecting wire 61a which extends from the twelfth coil W4 to the ninth coil W1. Accordingly, the ninth connecting wire 61a is positioned at a location at a distance of 2D from the support surface 21a. Thus, the location of the fifth connecting wire 51a and the ninth connecting wire 61a is determined in the axial direction.

The fifth connecting wire 51a is layered on the first connecting wire 41a in the axial direction. The ninth connecting wire 61a is layered on the fifth connecting wire 51a in the axial direction. That is to say, the third bottom surface 25c positions the fifth connecting wire 51a which then extends toward the extension portion 23 so that the fifth connecting wire 51a is tightly layered on the first connecting wire 41a which first extends toward the extension portion 23 in the axial direction. Likewise, the fourth bottom surface 25d positions the fifth connecting wire 51a which first extends toward the extension portion 23 so that the ninth connecting wire 61a which then extends toward the extension portion 23 is tightly layered on the fifth connecting wire 51a in the axial direction.

The thirteenth bottom surface 28c positions the eighth connecting wire 51d. The fourteenth bottom surface 28d positions the twelfth connecting wire 61d.

The bottom of the fourteenth notch 24n has a fifth bottom surface 25e. The fifth bottom surface 25e is at a distance of the diameter D from the support surface 21d. The fifth bottom surface 25e positions the second connecting wire 41b in terms of the axial direction. The second connecting wire 41b is located between the first connecting wire 41a and the fifth connecting wire 51a. That is to say, the fifth bottom surface 25e does not make direct contact with the fifth connecting wire 51a.

The fifth bottom surface 25e, however, positions the second connecting wire 41b, and thus, indirectly positions the fifth connecting wire 51a. Furthermore, the fifth bottom surface 25e also indirectly positions the ninth connecting wire 61a. The fifth connecting wire 51a is in such a state as to run over the second connecting wire 41b and be lifted by the distance of the diameter D in the axial direction. The ninth connecting wire 61a is in such a state as to run over the fifth connecting wire 51a and be lifted by the distance of the diameter D in the axial direction.

Thus, four connecting wires 41a, 41b, 51a, and 61a overlap on the support surface 21a in the axial direction. FIGS. 1A and 1B show the cross sections of the fourth connecting wire 41d, the eighth connecting wire 51d and the twelfth connecting wire 61d corresponding to the second engaging protrusion 27b.

In FIG. 3, H1 is the height of stacked connecting wires 41a to 61d. Stacked height H1 is four times greater than the diameter D of the lead wires 40 to 60, that is to say, 4D. H2 is the distance from the coil supporting surface 22a to the first coil end 44. Though H1 is greater than H2, the difference between H2 and H1 is within the diameter D. Accordingly, the twelfth connecting wire 61d which is placed adjacent to the distal end 23e is adjacent to the first coil end 44. In other words, the location of the twelfth connecting wire 61d approximately agrees with the first coil end 44 in terms of the axial direction.

As shown in FIG. 5, the protrusion 23b protrudes outward from the guide outer circumferential surface 23a in the radial direction. The protrusion 23b is located in the vicinity of the distal end 23e of the extension portion 23. The protrusion 23b functions as a regulation portion for keeping the connecting wires 41a to 61d from moving in the axial direction. The distance between the facing surface 23c and the support surface 21a is slightly greater than 4D. The connecting wires 41a to 61d are located between the support surface 21a and the facing surface 23c. The respective connecting wires 41a to 61d are secured to the guide outer circumferential surface 23a using, for example, impregnating varnish.

As shown in FIG. 1A, the inner circumferential surface 2f of the housing 2 has a facing region 2m which faces the connecting wires 41a to 61d. An insulating paint is applied in the facing region 2m so as to insulate the connecting wires 41a to 61d from the housing 2.

In a state where the lead wires 40 to 60 run around the guide outer circumferential surface 23a, the first terminals 42a to 62a and the second terminals 42b to 62b are arranged so as to reach the end frame 3. That is to say, the first terminals 42a to 62a and the second terminals 42b to 62b are located on the second surface 30a.

The first terminals 42a to 62a pass through the notches 24a to 24p, and thus, are drawn inside the extension portion 23 from the outside in the radial direction. After that, the first terminals 42a to 62a pass through the inside of the annular coating portion 21 in the radial direction in the axial direction, and are arranged so as to be directed toward the end frame 3. The lead wires 40 to 60 extend along the inner circumferential surface 21c of the annular coating portion 21. As shown in FIG. 1A, the first terminals 42a to 62a pass through the through hole 3c which is created in the end frame 3 and are arranged on the second surface 3f of the end frame 3. A circuit substrate 71 having the above described control circuit 70 and a motor cover 80 which covers the circuit substrate 71 are mounted on the second surface 3f. The first terminals 42a to 62a which are drawn out onto the second surface 3f are connected to the lead terminals 72 which extend from the control circuit 70 through fusion.

As shown in FIG. 3, a box 31 is attached to the second insulator 30. The second terminals 42b to 62b are electrically connected to each other through fusion and form a neutral point inside the box 31.

As shown in FIG. 1A, end frame 3 has a hole for exposure 3d which corresponds to the above described sensor magnet 9. The circuit substrate 71 has a hall IC 73 facing the sensor magnet 9. The Hall IC 73 is contained within the hole for exposure 3d. The Hall IC 73 detects the change in the magnetic flux which accompanies the rotation of the sensor magnet 9 and outputs a detection signal to the control circuit 70. The control circuit 70 detects the location where the rotor core 7 rotates using the detection signal. The control circuit 70 supplies a drive current to the lead wires 40 to 60 on the basis of the above described detection signal. As a result, a rotational magnetic field is generated in the stator 10, so that the rotor core 7 rotates.

As show in FIG. 1A, the rotary shaft 6a has a protruding portion 90 which protrudes from the housing 2. A joint 100 is attached to the protruding portion 90 by means of an attachment pin 102. The protruding portion 90 has an attachment hole 91 which extends in the radial direction and penetrates through the protruding portion 90. The joint 100 has an attachment hole 101 which penetrates through the joint 100 in the radial direction. The attachment hole 101 has a diameter which is slightly greater than that of the attachment hole 91. The attachment pin 102 penetrates through the attachment hole 101 and is press fitted into the above described attachment hole 91. As a result, the joint 100 is attached to the rotary shaft 6a. The joint 100 has a rotational engaging portion 103 which extends in the radial direction. The rotational engaging portion 103 is linked to a driven body (not shown). Accordingly, the brushless motor 1 in an operating state rotates the rotary shaft 6a so as to drive the driven body (not shown).

The present embodiment has the following advantages.

(1) The connecting wires 41a to 61d pass through the notches 24a to 24p, and thus, are led out from the inside of the extension portion 23 in the radial direction. As a result, the location where the connecting wires 41a to 61d reach the guide outer circumferential surface 23a is positioned in the axial direction and in the circumferential direction. Therefore, the work of attaching the connecting wires 41*a* to 61*d* to the stator 10 becomes easy.

(2) The connecting wires 41*a* to 41*d* are layered on the previously layered connecting wires 41*a* in the axial direction. Accordingly, the connecting wires 41*a* to 61*d* are indirectly positioned on the bottom surface 25*c* of the notch 24*p* by the previously layered connecting wire 41*a*. Accordingly, the dimensions of the extension portion 23 in the axial direction are no greater than the product of the diameter D of the connecting wires 41*a* to 61*d* and the connecting wires 41*a* to 61*d* which are layered in the axial direction. Accordingly, the brushless motor 1 can be reduced in size in the axial direction in comparison with the background technology in Japanese Laid-Open Patent Publication H11 (1999)-55883. Though in Japanese Laid-Open Patent Publication H11 (1999)-55883 the walls of the outer circumferential groove separate the connecting wires from each other, there are no such walls in the present embodiment.

(3) The location of the bottom surfaces 25*a* to 25*d* in the direction in which the extension portion 23 extends is set in accordance with the location where the connecting wires 41*a* to 61*d* reach the guide outer circumferential surface 23*a*. Therefore, bottom surfaces 25*c* and 25*d* prevent the connecting wires 41*a* to 61*d* from moving toward the proximal end 23*f*. Accordingly, a large load can be prevented from being applied to the lead wires 40 to 60 when the lead wires 40 to 60 are led out from the notches 24*a* to 24*p*.

Furthermore, it becomes unnecessary to additionally provide a guide portion for connecting the connecting wires 41*a* to 61*d* to the guide outer circumferential surface 23*a* on the guide outer circumferential surface 23*a*. Accordingly, the configuration for stacking the connecting wires 41*a* to 61*d* becomes simple.

(4) The locations of the connecting wires 61*d* and 61*a* placed in the vicinity of the distal end 23*e* are set so as to approximately agree with the first coil end 44. Therefore, the connecting wires 41*a* to 61*d* are located between the first coil end 44 and the second coil end 45 in the axial direction. Accordingly, the space required for attaching the connecting wires 41*a* to 61*d* to the guide outer circumferential surface 23*a* can be reduced in the axial direction. That is to say, the brushless motor 1 can be more compact in the axial direction.

(5) The lead wires 40 to 60 pass through the inside of the annular coating portion 21 in the radial direction and are arranged around the second insulator 30 after being attached to the guide outer circumferential surface 23*a*. As a result of this, the lead wires 40 to 60 are engaged with the extension portion 23. Accordingly, the lead wires 40 to 60 are arranged around the annular coating portion 21 while making contact with the annular coating portion. Accordingly, different steps of forming the first terminals 42*a* to 62*a* and the second terminals 42*b* to 62*b* are unnecessary.

In detail, the twelfth connecting wire 61*d* is the connecting wire which is the furthest from the end frame 3 in the axial direction. The first terminal 62*a* extends in the axial direction along the inner circumferential surface 21*c* of the annular coating portion 21 so as to be directed to the end frame 3. Accordingly, the twelfth connecting wire 61*d* which is connected to the first terminal 62*a* is drawn toward the end frame 3. The wire 60 makes contact with the inner circumferential surface 21*c* of the annular coating portion 21. As a result of this, the twelfth connecting wire 61*d* presses the connecting wires 41*a*, 41*d* and 51*d* towards the end frame 3. That is to say, the twelfth connecting wire 61*d* keeps the connecting wires 41*a*, 41*d*, and 51*d* from moving in the axial direction. Accordingly, it becomes easier to prevent the connecting wires 41*a*, 41*d*, and 51*d* from sticking out.

(6) The extension portion 23 extends in the axial direction from the portion of the inside in the radial direction of the support surface 21*a* of the annular coating portion 21 toward the direction opposite to the end frame 3. Therefore, the extension portion 23 is located inside the base outer circumferential surface 21*b* in the radial direction. Accordingly, the connecting wires 41*a* to 61*d* are unlikely to protrude outward in the radial direction. As a result of this, the diameter of the stator 10 can be reduced.

(7) The protrusion 23*b* keeps the connecting wires 41*a* to 61*d* from moving in the axial direction. Accordingly, the connecting wires 41*a* to 61*d* can be held by the extension portion 23 in the axial direction.

(8) Resins for fixture, such as impregnating varnish, secure the connecting wires 41*a* to 61*d* to the guide outer circumferential surface 23*a*. Accordingly, the connecting wires 41*a* to 61*d*, for example, can be prevented from being lifted off the first insulator 20 or the second insulator 30 so as to make contact with the housing 2.

(9) The coils U1 to W4 are winded around the teeth 13*a* to 13*l* so that the lead wires 40 to 60 are layered like stacked barrels when viewed in the cross section. Accordingly, the coils U1 to W4 are arranged with high density. As a result of this, the ratio of the area occupied by the coils U1 to W4 can be increased. Accordingly, the stator 10 can further be reduced in size.

(10) The extension portion 23 is placed on the side opposite to the end frame 3. Therefore, the stator 10 is contained in the housing 2 without the extension portion 23 interfering with the engaging portion 3*a* of the end frame 3. Accordingly, the brushless motor 1 can further be reduced in size in the axial direction. The engaging portion 3*a* is engaged with the housing 2 from the inside.

(11) The control circuit 70 is placed on the surface of the end frame 3 which is directed opposite to the stator 10. Accordingly, the control circuit 70 can be prevented from becoming an obstacle between the stator 10 and the end frame 3. As a result of this, it becomes possible to shorten the rotary shaft 6*a* in comparison with the case where, for example, the control circuit 70 is placed on the surface of the end frame 3 which is directed toward the stator 10. Accordingly, the brushless motor 1 can further be reduced in size in the axial direction. As a result of this, it becomes easy to form a brushless motor 1 with a control circuit 70.

Furthermore, it is easy to connect the first terminals 42*a* to 62*a* of the lead wires 40 to 60 directly to the control circuit 70. Accordingly, conductive members for connecting the first terminals 42*a* to 62*a* to the control circuit 70 can be eliminated.

The end frame 3 is placed between the control circuit 70 and the stator 10. Therefore, it is easy to prevent the heat emitted from the stator 10, that is to say, the heat emitted from the brushless motor 1, from directly affecting the control circuit 70. Furthermore, the heat emitted from the control circuit 70 conveys to this end frame 3, and thereby, heat can be released efficiently.

(12) The containing recess 7*b* in the second end surface 7*d* of the rotor core 7 contains the second bearing 5. The second bearing 5 overlaps with the rotor core 7 in the axial direction when viewed from the outside in the radial direction. Accordingly, it is possible to shorten the rotary shaft 6*a*. Accordingly, the brushless motor 1 can further be reduced in size in the axial direction.

(13) The protruding portion 90 of the rotary shaft 6*a* has an attachment hole 91 for securing the joint 100. The joint 100 can be easily attached to the rotary shaft 6a in the present embodiment, in comparison with a case where, for example the joint 100 is secured directly to a distal end of the rotary shaft 6a.

The joint 100 is linked to the rotary shaft 6a from the outside in the radial direction. When the brushless motor 1 is flat, a motor assembly having few projecting portions can be formed as the brushless motor 1 and the joint 100. As a result, the space for placing the motor assembly can be made smaller, and the motor assembly can be made easier to handle.

(14) An insulating paint is applied in a portion of the inner circumferential surface 2f of the housing 2 which faces the connecting wires 41a to 61d, so that the housing 2 and the connecting wires 41a to 61d are insulated from each other. Accordingly, insulation between the connecting wires 41a to 61d and the housing 2 can be achieved without fail.

(15) The permanent magnet 8 is embedded in the rotor core 7. As a result, the motor torque can be increased, and thus, the brushless motor 1 can further be reduced in size. The motor torque increases as a result of the attracting effects and the repelling effects between the permanent magnet 8 and the stator 10, and the attracting effects and the repelling effects between the rotor core 7 and the stator 10.

(16) The teeth 13a to 13l are formed integrally with the annular portion 12. Therefore, the length of the connecting wires 41a to 61d can be kept to the required minimum without slack. Accordingly, the electrical resistance in the connecting wires 41a to 61d can be kept to the required minimum. That is to say, the output of the brushless motor 1 can be increased.

The present embodiment is compared with a case where, for example, divided core pieces, each of which has teeth, are put together into a stator core 11. A coil is formed around each tooth in a state where the divided core pieces are aligned in line form, so that the respective teeth are arranged so as to be parallel to each other. After the formation of the coil, the divided core pieces are arranged in annular form, and thus, the stator core is formed. When the divided core pieces are arranged in annular form, it is necessary to prepare long wires, so that the respective connecting wires do not push against each other and the respective connecting wires have slack. In the present embodiment, however, the teeth 13a to 13l are integrated with the annular portion 12, and therefore, slack is unnecessary for the respective connecting wires.

(17) The connecting wires 41a to 61d pass through the notch 24, and thus, are led out from inside the extension portion 23 to the outside in the radial direction so as to run along the guide outer circumferential surface 23a. The connecting wires 41a to 61d run along the guide outer circumferential surface 23a and pass through the next notch 24, and thus, are drawn into the extension portion 23 from the outside in the radial direction. As a result, the connecting wires 41a to 61d are pressed against the guide outer circumferential surface 23a. Accordingly, the connecting wires 41a to 61d can be prevented from spreading to the outside in the radial direction. As a result, an additional step for forming the connecting wires 41a to 61d becomes unnecessary.

(18) The lead wires 40 to 60 are wound around the respective teeth 13 starting from the proximal end of the respective teeth 13. The interval between the proximal ends of the teeth 13 is greater than the interval between the distal ends of the teeth 13 in the inner rotor type brushless motor 1. Accordingly, it is easy to arrange the lead wires 40 to 60 on the inner circumferential surface 21c of the annular coating portion 21. The size of the coils U1 to W1 can be reduced in the radial direction, in comparison with a case where, for example, the point at which the lead wire 40 starts winding is at a distal end of a tooth 13. That is to say, the stator 10 can be reduced in size.

(19) The lead wires 40 to 60 are wound around the respective teeth 13a to 13l in such a manner that the wires are directed from the proximal end of the teeth 13a to 13l to the distal end one after another. Therefore, the lead wires 40 to 60 are wound around the teeth 13a to 13l in such a state that the connecting wires 41a to 61d do not cause any hindrance. Accordingly, the lead wires 40 to 60 are easy to align around the corresponding teeth 13. Accordingly, the stator 10 can further be reduced in size.

(20) The connecting wires 41c, 51b, 51c and 61b are layered on top of each other on the guide outer circumferential surface 23a in the axial direction. Accordingly, the size of the support surface 21a in the radial direction may have any value that corresponds to the diameter D of the connecting wire 41c. Accordingly, the stator 10 can be reduced in size in the radial direction. The brushless motor 1 can further be reduced in size.

The size of the guide outer circumferential surface 23a in the axial direction can be kept to a value corresponding to the sum 4D of the diameter D of the connecting wires 41c, 51b, 51c and 61b. Accordingly, the stator 10 can be reduced in size in the axial direction. The brushless motor 1 can further be reduced in size in the axial direction.

The connecting wires 41c, 51b, 51c and 61b are layered on top of each other in the axial direction, and therefore, it is easy to arrange the lead wires 40 to 60.

Figure 7A:
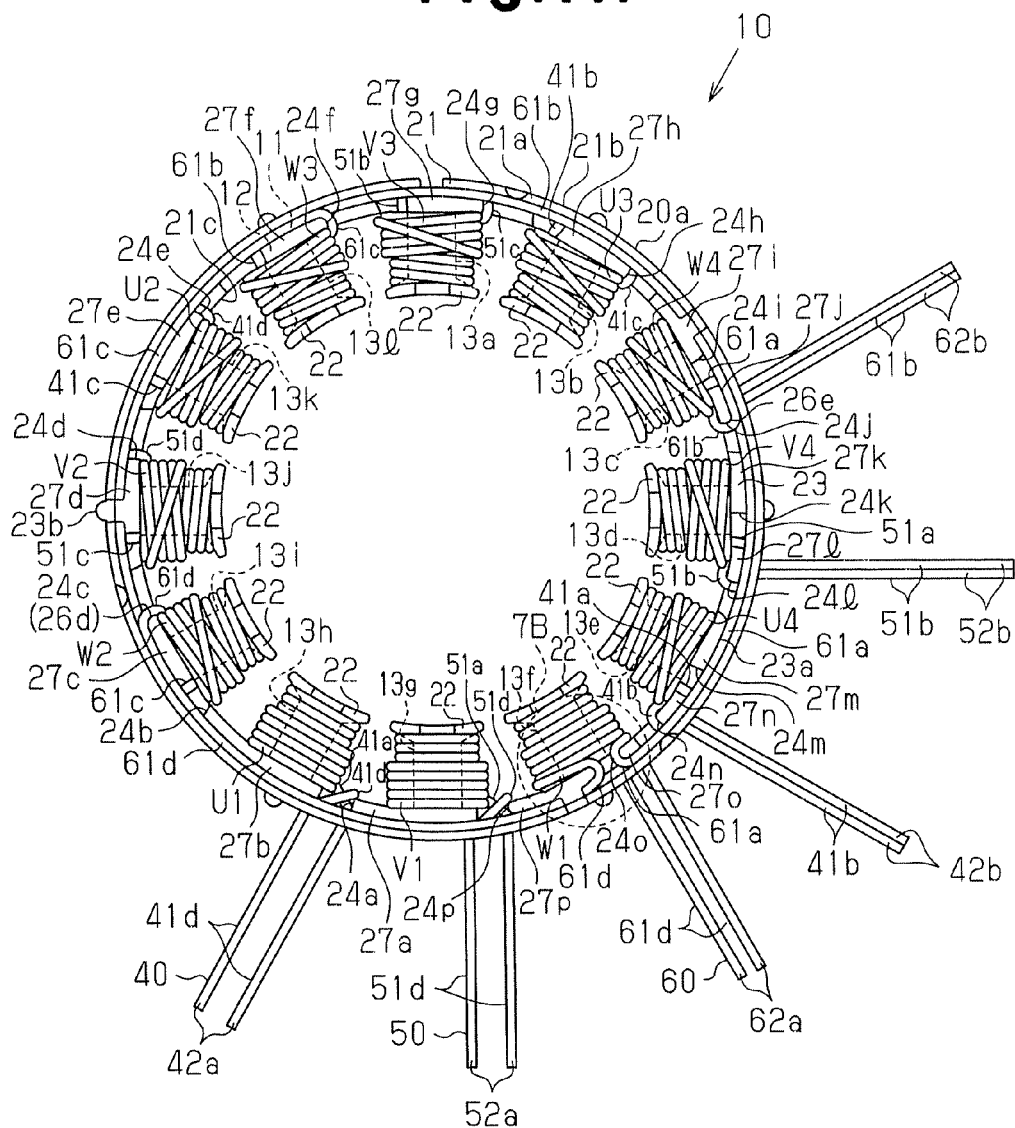
FIG. 7A is a front view showing a stator according to the second embodiment of the present invention.
Figure 7B:
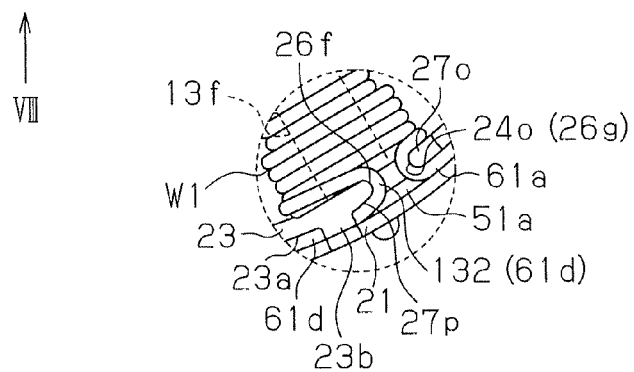
FIG. 7B is a partially enlarged view showing a notch portion shown in FIG. 7A.

In the following, the second embodiment of the present invention is described in reference to FIGS. 7A, 7B and 8.

The fifteenth engaging protrusion 27o has a sixth side surface 26f in a fifteenth notch 24o. The sixteenth engaging protrusion 27p has a seventh side surface 26g in the fifteenth notch 24o.

The twelfth connecting wire 61d is bent at the fifteenth notch 24o to an angle which exceeds 90°. The ninth connecting wire 61a is bent at the fifteenth notch 24o to an angle which exceeds 90°.

In detail, the twelfth connecting wire 61d is bent in a plane which is vertical to the axial direction to an angle which exceeds 90°. The sixth side surface 26f is at a distance from the side surface of the ninth coil W1 in the circumferential direction. Accordingly, the twelfth connecting wire 61d extends from the ninth coil W1 to the fifteenth notch 24o in the circumferential direction and is bent around the sixth side surface 26f to an angle of 180°, and thus, passes through the fifteenth notch 24o, and after that, extends along the guide outer circumferential surface 23a.

In other words, the sixth side surface 26f bends the twelfth connecting wire 61d by 180°, so that the wire returns from the outward direction in the radial direction of the fifteenth notch 24o to the inward direction. As a result, the twelfth connecting wire 61d is engaged with the extension portion 23 in the circumferential direction and in the radial direction. That is to say, the twelfth connecting wire 61b is bent by 180° by the side wall (26f) of the fifteenth engaging protrusion 27o. The portion of the twelfth connecting wire 61d which is bent by 180° is referred to as bent portion 132.

Likewise, the seventh side surface 26g bends the ninth connecting wire 61a by 180°, so that the wire returns from the outward direction in the radial direction of the fifteenth notch 24o to the inward direction, and thus, the ninth connecting wire 61a is engaged in the circumferential direction and in the radial direction.

The second embodiment has the following advantages.

(21) The sixteenth engaging protrusion 27*p* bends the twelfth connecting wire 61*d* by 180°, so that the wire returns from the outward direction in the radial direction of the fifteenth notch 24*o* to the inward direction, and thus, the twelfth connecting wire 61*d* is engaged in the circumferential direction and in the radial direction. Accordingly, the twelfth connecting wire 61*d* is maintained in such a state as to be arranged on the guide outer circumferential surface 23*a*. Therefore, the twelfth connecting wire 61*d* can be prevented from protruding without providing a stopper especially for preventing the twelfth connecting wire 61*d* from moving outward in the radial direction. Accordingly, the gap between the housing 2 and the stator 10 can be reduced in the radial direction. Accordingly, the brushless motor 1 can further be reduced in size.

The above described embodiment may be modified in the following manner.

In the above described embodiment, the distance between the first bottom surface 25*a* to the fifth bottom surface 25*e* and the support surface 21*a* is set in accordance with the location where the connecting wires 41*a* to 61*d* reach the guide outer circumferential surface 23*a*. However, the invention is not limited to this embodiment, and the distance between the first bottom surface 25*a* to the fifth bottom surface 25*e* and the support surface 21*a* may be set to a constant value. In this case also, the connecting wire that is arranged afterward in the extension portion 23 is positioned indirectly on the bottom surface 25 by the connecting wire that is previously arranged in the extension portion 23.

Grooves and protrusions for guiding the connecting wires 41*a* to 61*d* may be separately provided on the guide outer circumferential surface 23*a*.

In the above described embodiment, the first bottom surface 25*a* and the second bottom surface 25*b* are in the same plane as the support surface 21*a*. However, the invention is not limited to this embodiment, and the first bottom surface 25*a* and the second bottom surface 25*b* may be at a distance from the support surface 21*a* in the axial direction.

In the above described embodiment, the distance between the first bottom surface 25*a* and the third bottom surface 25*c* is not limited to being equal to the diameter D of the lead wires 40 to 60, and may be greater than the diameter D. In this case, spaces may be provided between connecting wires 41*a* to 61*d* on the guide outer circumferential surface 23*d*. In this manner, the distance between the support surface 21*a* and the bottom surface 25 may be changed to an appropriate distance.

In the above described embodiment, the protrusion 23*b* is provided at the distal end 23*e* of the extension portion 23. The protrusion 23*b* functions as a regulating portion for keeping the connecting wires from moving in the axial direction. However, the invention is not limited to this embodiment, and the protrusion 23*b* may be provided in the vicinity of the proximal end 23*f*. In this case, the protrusion 23*b* is located between the connecting wires 41*a* to 61*d*.

In order to form the regulating portion, guide outer circumferential surface 23*a* may, for example, be inclined, so that the distal end 23*e* is arranged outside the proximal end 23*f* in the radial direction. That is to say, the protrusion 23*b* may be omitted.

In the above described embodiment, the first terminals 42*a* to 62*a* and the second terminals 42*b* to 62*b* are arranged on the second insulator 30. However, the location where the first terminals 42*a* to 62*a* and the second terminals 42*b* to 62*b* are attached can be changed to an appropriate location in accordance with the location of the control circuit 70.

In the above described embodiment, the extension portion 23 is in annular form. However, the invention is not limited to this embodiment, and the extension portion 23 can be changed to an appropriate configuration as long as the guide outer circumferential surface 23*a* is provided outside the first coil end 44 in the radial direction so that the connecting wires 41*a* to 61*d* do not make contact with the coils U1 to W4.

In the above described embodiment, the guide outer circumferential surface 23*a* is arranged inside the base outer circumferential surface 21*b* in the radial direction. However, the invention is not limited to this embodiment, and the guide outer circumferential surface 23*a* may be in the same plane as the base outer circumferential surface 21*b*.

The depth of the containing recess 7*b* may be increased, so that the entirety of the second bearing 5 is arranged between the first coil end 44 and the second coil end 45. That is to say, the second end surface 5*b* of the second bearing 5 which is directed to the end frame 3 may be arranged between the first coil end 44 and the second coil end 45. In this case, the brushless motor 1 can further be reduced in size in the axial direction.

In the above described embodiment, the joint 100 is secured to the rotary shaft 6*a* by means of an attachment pin 102 which is inserted through the attachment hole 91. This may be changed so that the joint 100 is secured to the rotary shaft 6*a* by means of, for example, bolts.

In the above described embodiment, the annular portion 12 of the stator core 11 is formed integrally with the teeth 13*a* to 13*l*. However, the invention is not limited to this embodiment, and the stator core 11 may be formed by putting the divided core pieces together. Each of the divided core pieces has a form that is gained by dividing the stator core 11 in the circumferential direction at intervals of equal angles. Each of the divided core pieces has, for example, an arc portion which is gained by dividing the annular portion 12 and one tooth which extends from this arcuate portion.

In the above described embodiment, the permanent magnet 8 is embedded in the rotor core 7. However, this may be changed so that the permanent magnet 8 is secured on the outer circumferential surface of the rotor core 7.

In the above described embodiment, an insulating paint is applied in the facing region 2*m* which faces the connecting wires 41*a* to 61*d* from among the inner circumferential surface 2*f* of the housing 2. However, an insulating paint may be applied on the entirety of the inner circumferential surface 2*f* instead of only in the facing region 2*m*.

Figure 9:
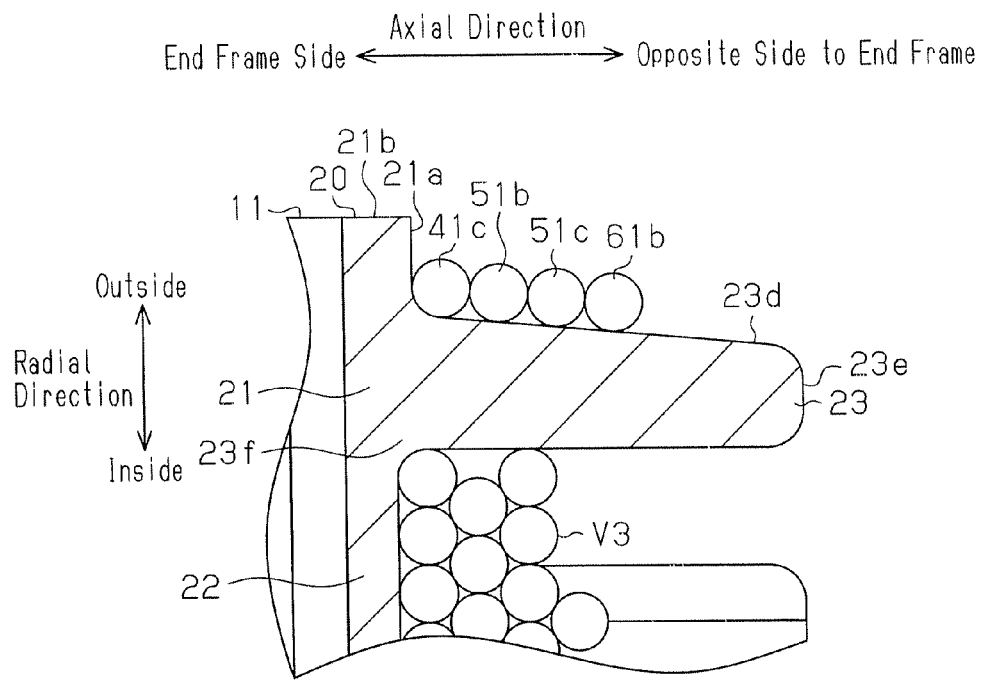
FIG. 9 is an enlarged view showing an extension portion in a modified embodiment.

FIG. 9 shows a guide outer circumferential surface 23*d* on the extension portion 23 in a modified embodiment. The guide outer circumferential surface 23*d* is inclined, and thus, the distal end 23*e* is located inside the proximal end 23*f* in the radial direction. In FIG. 9, the distal end 23*e* is located on the lower right of the proximal end 23*f*. In this case, the connecting wires 41*c*, 51*b*, 51*c* and 61*b* are layered on top of each other in sequence while making contact with the guide outer circumferential surface 23*d*. The center of the second connecting wire 61*b* which is placed later is located inside the center of the first connecting wire 51*c* which is placed first in the radial direction. The recess which is defined by the first connecting wire 51*c* and the guide outer circumferential surface 23*d* is engaged with the second connecting wire 61*b*. Accordingly, the work of layering the connecting wires 41*a* to 61*d* in the axial direction is easy. Thus, the invention is not limited to an embodiment where the guide outer circumferential surface 23*a* extends parallel to the axial direction.

Figure 10:
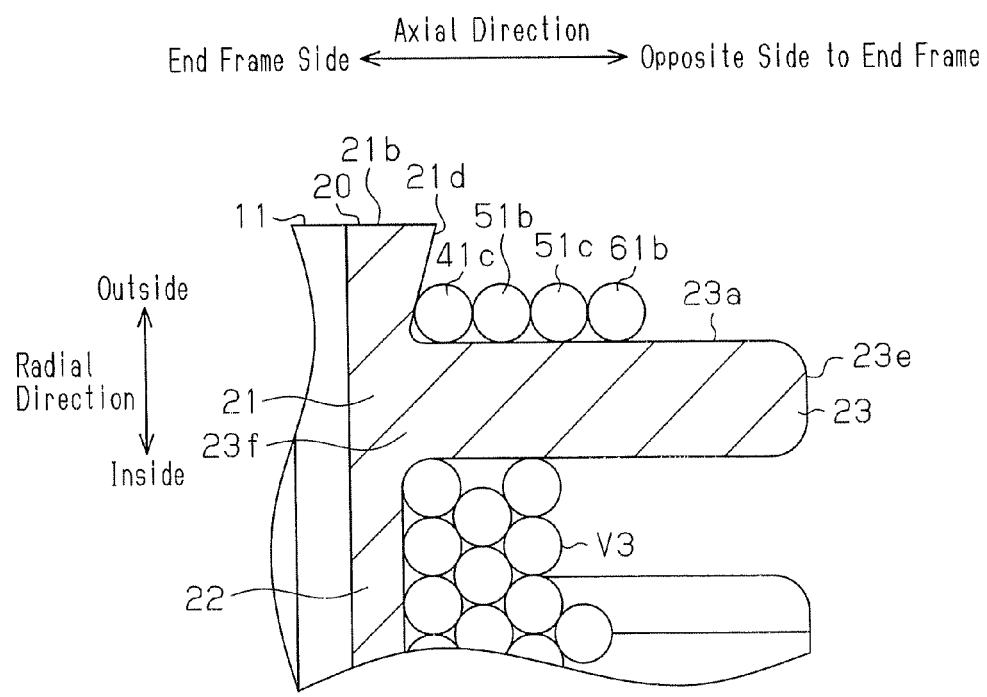
FIG. 10 is an enlarged view showing an extension portion in another modified embodiment.

FIG. 10 shows a support surface 21*d* in a modified embodiment. The support surface 21*d* is inclined relative to the radial direction. The angle formed between the support surface 21*d* and the guide outer circumferential surface 23*d* has a value that is smaller than 90°. The support surface 21*d* becomes closer to the distal end 23e in the axial direction further to the outside in the radial direction. That is to say, the support surface 21d is inclined relative to the radial direction, so that the outer end of the support surface 21d in the radial direction protrudes in the axial direction.

In this case, the connecting wire 41c which is arranged in the vicinity of the proximal end 23f is engaged in the recess between the support surface 21d and the guide outer circumferential surface 23a. The work of layering the connecting wires 41a to 61d in the axial direction is easy. Thus, the support surface 21a of the annular coating portion 21 is not limited to being vertical to the axial direction.

Figure 11:
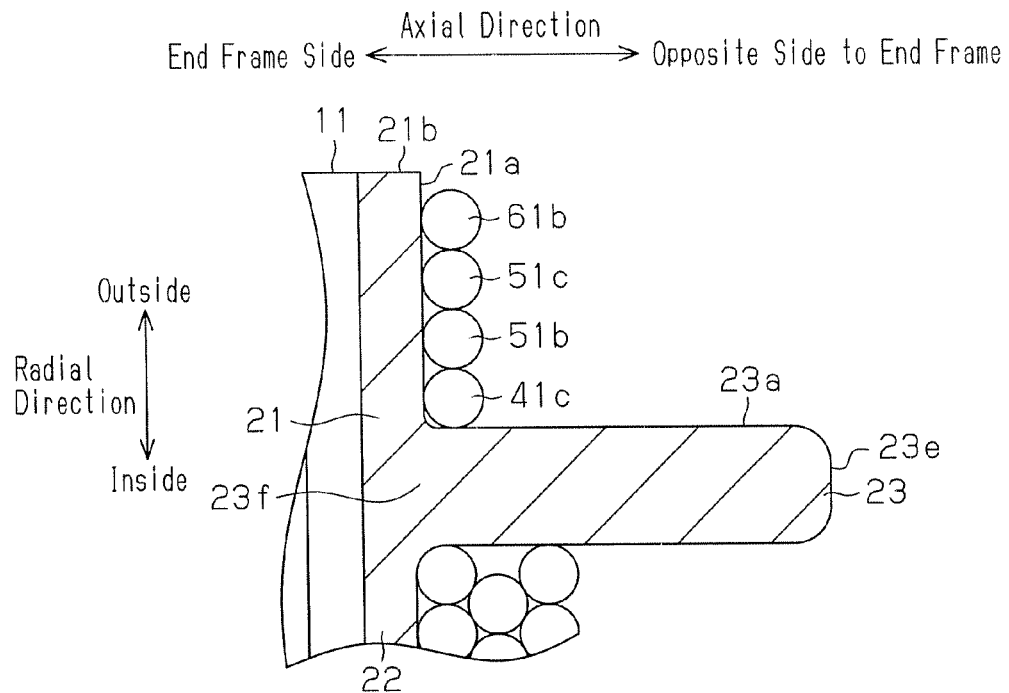
FIG. 11 is an enlarged view showing an extension portion in yet another modified embodiment.

As shown in FIG. 11, the connecting wires 41c, 51b, 51c and 61b may be layered on top of each other in the radial direction. That is to say, the connecting wires 41c, 51b, 51c and 61b are arranged on the support surface 21a. The sixth connecting wire 51b, for example, is arranged afterward so as to be layered on top of the previously arranged third connecting wire 41c in the radial direction. The size of the extension portion 23 in the axial direction in FIG. 11 can be reduced in comparison with a case where the connecting wires 41c, 51b, 51c and 61b are layered on top of each other in the axial direction. Accordingly, the brushless motor 1 can further be reduced in size in the axial direction.

Figure 12:
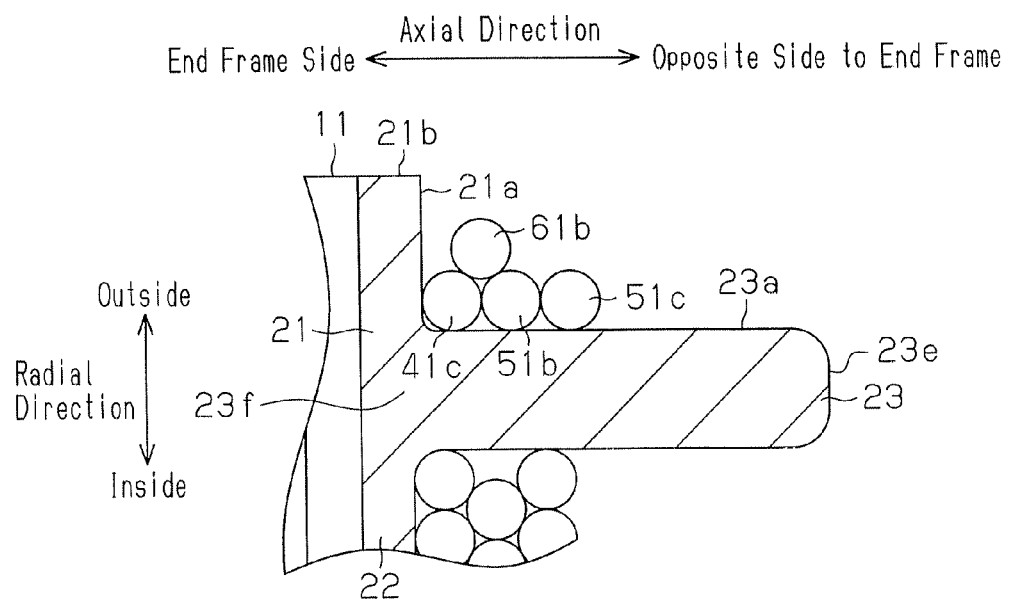
FIG. 12 is an enlarged view showing an extension portion in still yet another modified embodiment.

As shown in FIG. 12, the connecting wires 41c, 51b and 61b may be layered like stacked barrels. The tenth connecting wire 61b is engaged in the recess between the third connecting wire 41c and the sixth connecting wire 51b. The connecting wires 41c, 51b, 51c and 61b shown in FIG. 12 are arranged with high density on the first insulator 20 in comparison with the case where the wires are, for example, layered only in the axial direction or only in the radial direction. Accordingly, the stator 10 and the brushless motor 1 can further be reduced in size.

Figure 13A:
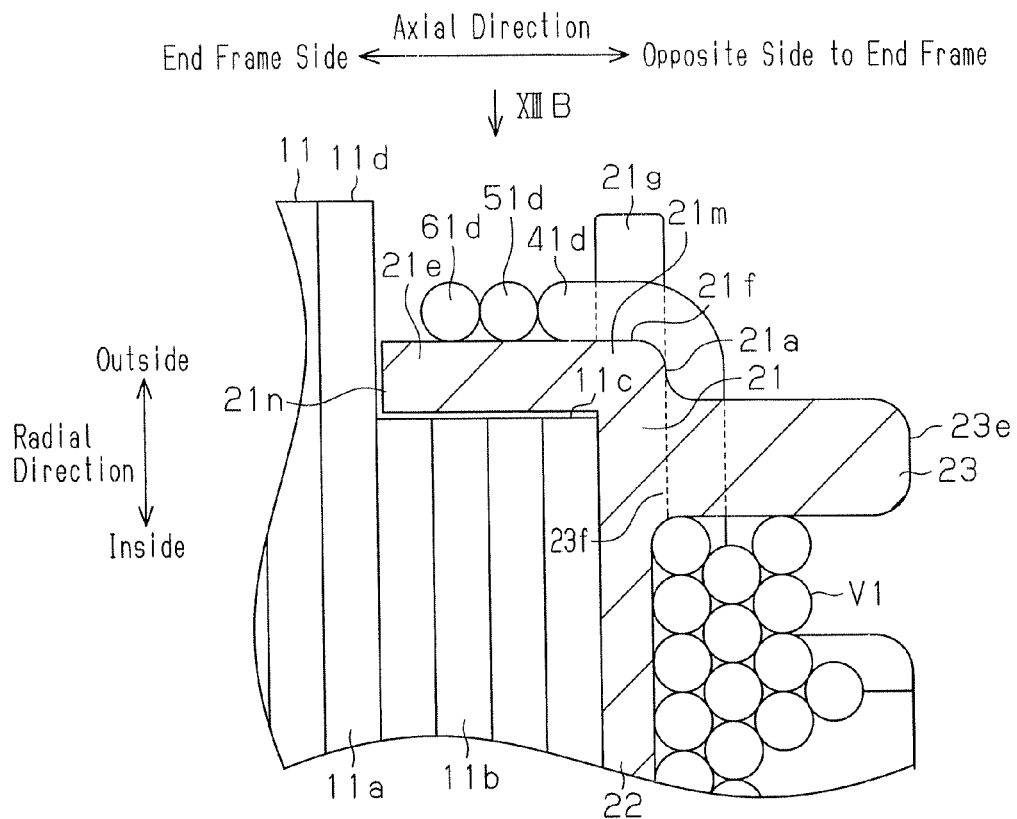
FIG. 13A is an enlarged view showing a peripheral portion of the extension portion in another modified embodiment.
Figure 13B:
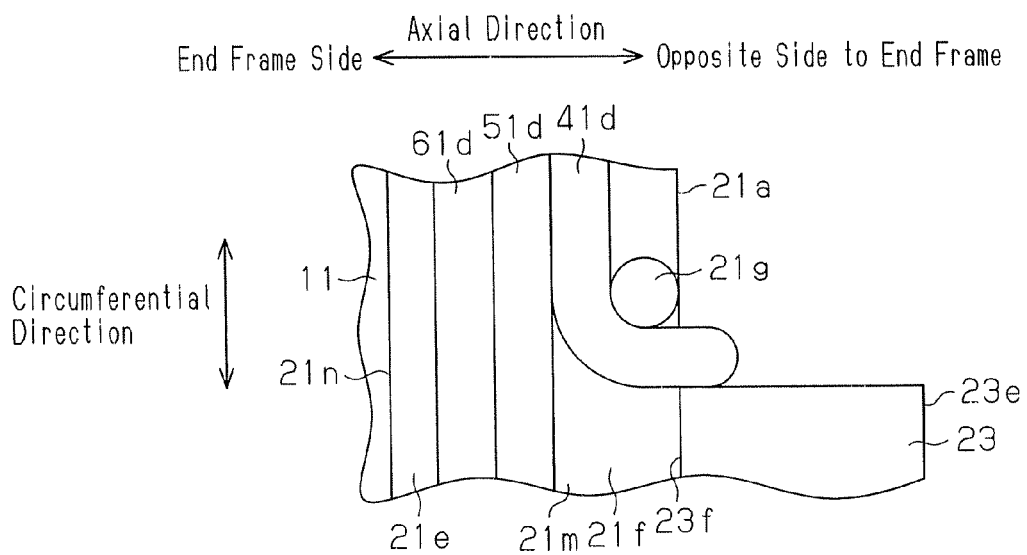
FIG. 13B is a side view showing the enlarged peripheral portion of the extension portion of FIG. 13A as viewed from the direction of arrow XIII.

A modified embodiment shown in FIGS. 13A and 13B is provided with a second extension portion 21e in annular form which extends from the annular coating portion 21 toward the end frame 3. The second extension portion 21e has a second guide outer circumferential surface 21f which is the outer circumferential surface. The connecting wires 41a to 61d may be arranged on the second guide outer circumferential surface 21f. The second extension portion 21e has a proximal end 21m and a distal end 21n which is located on the left of the proximal end 21m in FIGS. 13A and 13B.

As shown in FIG. 13A, the stator core 11 is in step form with a large diameter portion 11a and a small diameter portion 11b which extends from this large diameter portion 11a to the side opposite to the end frame 3. The stator core 11 has a large outer circumferential surface 11d, which is the outer circumferential surface of the large diameter portion 11a, and a small outer circumferential surface 11c, which is the outer circumferential surface of the small diameter portion 11b. The diameter of the large outer circumferential surface 11d is equal to the inner diameter of the above described housing 2.

The second extension portion 21e covers the small outer circumferential surface 11c from the outside in the radial direction. The outer diameter of the second extension portion 21e is smaller than the outer diameter of the large diameter portion 11a. That is to say, the second guide outer circumferential surface 21f is located inside the large outer circumferential surface 11d in the radial direction.

An engaging protrusion 21g which extends in the radial direction is formed on the second guide outer circumferential surface 21f. The engaging protrusion 21g functions as an engaging portion which extends in the radial direction. The distal end of the engaging protrusion 21g is located slightly inside the large outer circumferential surface 11d in the radial direction.

As shown in FIG. 13A, the fourth connecting wire 41d is drawn out from the extension portion 23 from the inside in the radial direction, and arranged on the second guide outer circumferential surface 21f so as to run 90° around the engaging protrusion 21g. After that, the fourth connecting wire 41d is arranged on the second guide outer circumferential surface 21f so as to extend in the circumferential direction. The fourth connecting wire 41d, the eighth connecting wire 51d and the twelfth connecting wire 61d are layered on the second guide outer circumferential surface 21f in the axial direction starting from the proximal end 21m toward the distal end 21n in this order.

In this case, the connecting wires 41a to 61d are positioned in the axial direction and in the circumferential direction by the engaging protrusion 21g which extends in the radial direction. The connecting wires 41a to 61d are positioned outside the extension portion 23 in the radial direction, and therefore, are easy to arrange on the guide outer circumferential surface 23a.

Figure 14:
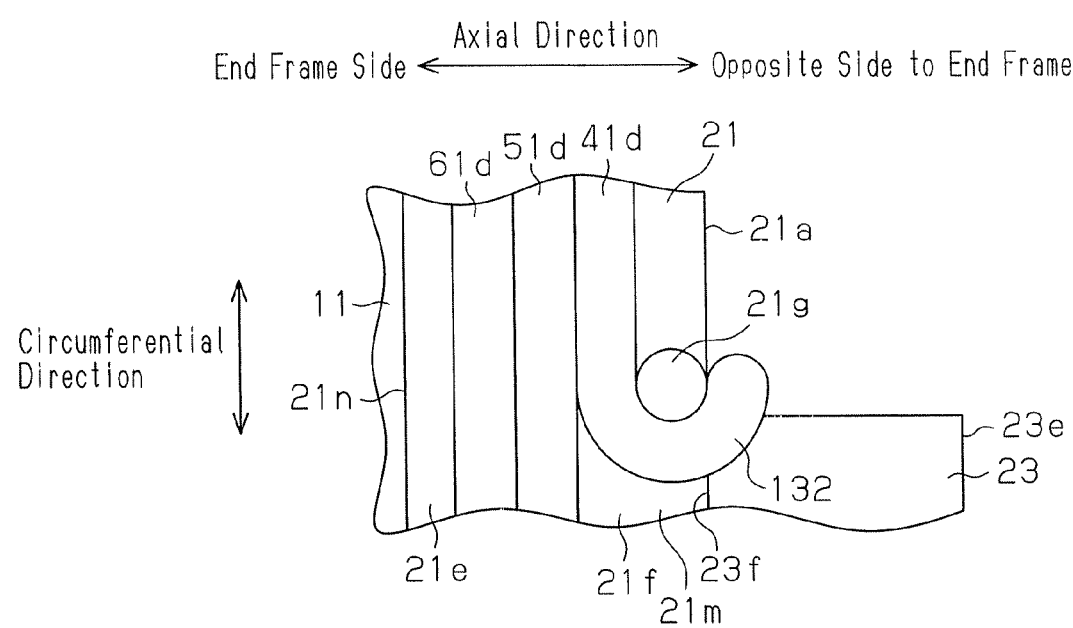
FIG. 14 is a side view showing an enlarged peripheral portion of an extension portion in another modified embodiment.

As shown in FIG. 14, the fourth connecting wire 41d may be bent to an angle which exceeds 90°, so that the fourth connecting wire 41d is wound around the engaging protrusion 21g. In this case, the fourth connecting wire 41d can be engaged with the engaging protrusion 21g in the radial direction and in the circumferential direction.

All of the connecting wires 41a to 61d may be bent to an angle which exceeds 90° so as to be directed from the outward direction in the radial direction of the extension portion 23 to the inward direction. In this case, slack can be prevented without fail for all the connecting wires 41a to 61d. Accordingly, it is even easier to prevent the connecting wires 41a to 61d from protruding in the radial direction.

The twelfth connecting wire 12d is positioned by, for example, the fourth side surface 26d which functions as a first engaging portion. Furthermore, the twelfth connecting wire 12d is positioned by the sixth side surface 26f which functions as the second engaging portion.

The lead wires 40 to 60 are not limited to being wound around the coils U1 to W4 like stacked barrels in the cross section.

Figure 15:
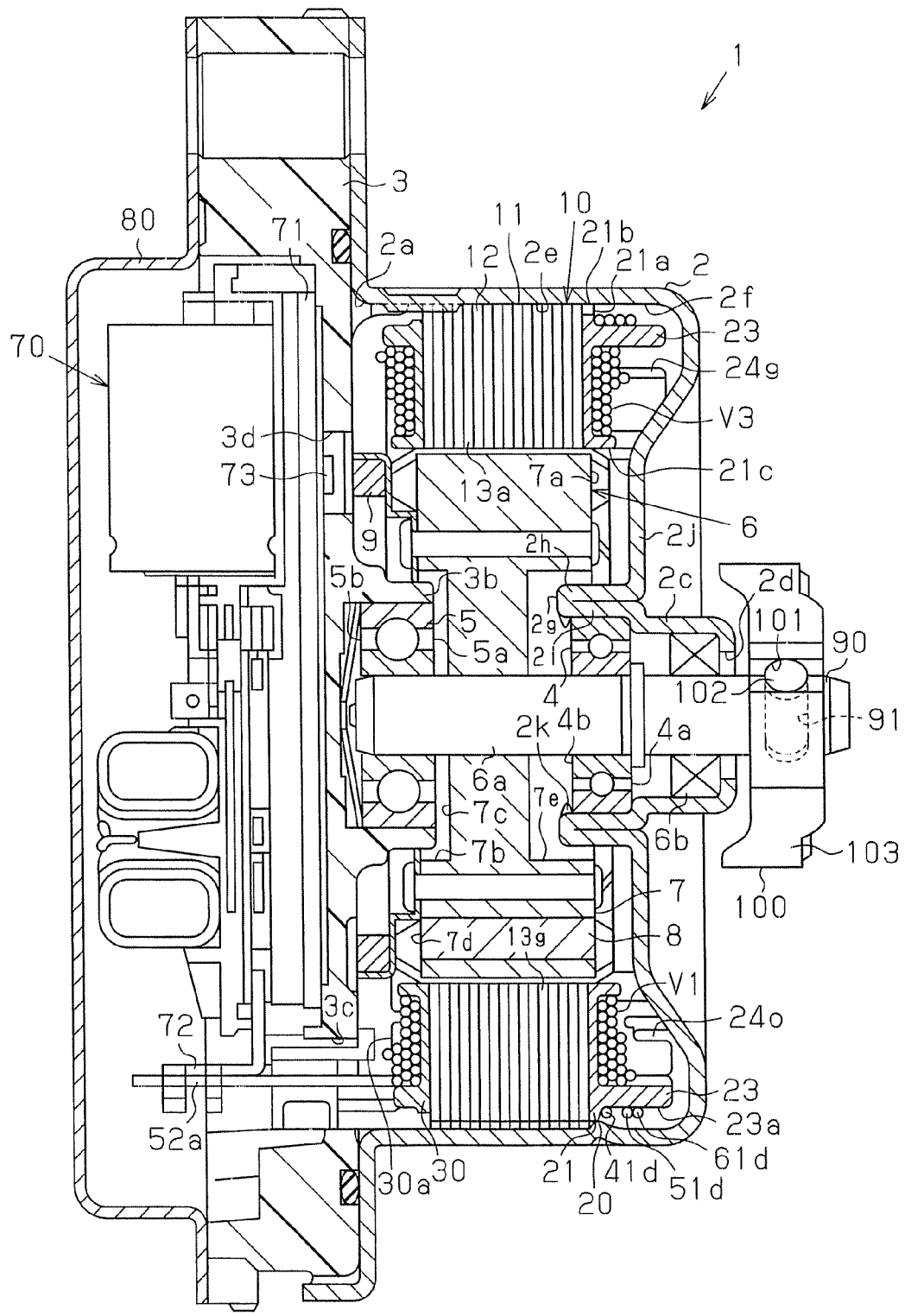
FIG. 15 is a longitudinal cross-sectional view showing a brushless motor in another modified embodiment.

As shown in FIG. 15, a containing recess 7e may be created also in the first end surface 7a of the rotor core 7. That is to say, in the above described embodiment shown in FIG. 1, the containing recess 7b is provided only on the second end surface 7d of the rotor core 7 which is directed toward the end frame 3.

In FIG. 15, the first bearing 4 is contained in the containing recess 7e, and thus, the rotary shaft 6a can further be shortened. Accordingly, the brushless motor 1 can further be reduced in size in the axial direction.

In the above described embodiment, the containing recess 7b may be omitted.

As shown in FIG. 15, the first containing portion 2g may have a double wall structure with a first wall portion 2h and a second wall portion 2i which overlaps with the first wall portion 2h. In this case, the strength of the first containing portion 2g increases. The double wall structure can be formed easily through, for example, a squeezing process.

The first wall portion 2h extends from the bottom 2j of the housing 2 toward the opening 2a. The second wall portion 2i is bent so as to run from the first wall portion 2h toward the bottom 2j, and thus, overlaps with the first wall portion 2h. The first wall portion 2h and the second wall portion 2i are formed in such a manner that the first containing portion 2g does not protrude to the outside of the housing 2 from the bottom 2*j*. Accordingly, the brushless motor 1 can be easily attached to other members.

As shown in FIG. 15, an engaging portion 2*k* for keeping the first bearing 4 from moving in the axial direction may be provided in the first containing portion 2*g* for containing the first bearing 4. There is a gap between the rotor 6 and the housing 2 in the axial direction, so that contact between the two can be prevented. There is a similar gap between the rotor 6 and the end frame 3 in the axial direction. The provision of the engaging portion 2*k* makes it possible to make these gaps smaller. Accordingly, the brushless motor 1 can further be reduced in size in the axial direction. The engaging portion 2*k* can easily be formed by caulking the wall of the first containing portion 2*g*.

What is claimed is:

1. A stator, comprising:
   a stator core having an annular portion defining an axial direction and a plurality of teeth which extend inward from the annular portion in the radial direction;
   an insulator having an annular coating portion for coating the annular portion and a plurality of tooth coating portions which extend inward from the annular coating portion
   in the radial direction in order to coat the respective teeth;
      a plurality of coils, each of which is formed of a lead wire wound around a tooth from among the teeth in such a state that the coils are separated from the teeth by the tooth coating portions, wherein the teeth include a first tooth and a second tooth around which the lead wire is wound after being wound around the first tooth;
      a connecting wire which includes a portion of the lead wire which extends from the first tooth to the second tooth so as to connect the coils; and an extension portion which is provided to the annular coating portion so as to extend in the axial direction, wherein the extension portion has: a distal end in the axial direction; a proximal end; a notch which extends from the distal end toward the proximal end; a bottom surface and side surfaces for defining the notch; and a radially outer surface, and the connecting wire is arranged so as to extend from the first tooth, be positioned by the bottom surface and the side surfaces, be led out from the notch in the radial direction of the extension portion, run along the radially outer surface, and be directed to the second tooth;
      wherein the connecting wire is one of a plurality of connecting wires, and the connecting wires include a first connecting wire which makes contact with the bottom surface and a second connecting wire which is positioned following the first connecting wire; and
      wherein second connecting wire is layered on the first connecting wire in the axial direction, and thus, the second connecting wire is indirectly positioned by the bottom surface.
2. The stator according to claim 1, wherein the position of the bottom surface is set in the axial direction in accordance with the positions of the connecting wires which are positioned by the bottom surface.
3. The stator according to claim 1, wherein the outer surface in the radial direction is inclined so that the distal end is positioned inside the proximal end in the radial direction.
4. The stator according to claim 1, wherein the annular coating portion has a support surface for supporting the connecting wire outside the extension portion in the radial direction, and
   wherein the support surface is inclined relative to the radial direction so that the outer end of the support surface in the radial direction protrudes in the axial direction.
5. The stator according to claim 1, wherein the coils have an axial end, and
   wherein the position of the connecting wire which is in close proximity to the distal end agrees in the axial direction with the position of the axial end.
6. The stator according to claim 1, wherein the stator core has a first end where the tension portion is located in the axial direction and a second end on the side opposite to the first end, and
   wherein terminals of the lead wire are led out from the notch in the radial direction off the extension portion, extend along the radially outer surface, pass through the inside of the annular coating portion in the radial direction, and thus, are arranged around the second end.
7. The stator according to claim 1, wherein the extension portion is positioned inside the outer circumference of the annular coating portion such that the connecting wires are arranged inside the outer circumference in the radial direction.
8. The stator according to claim 1, wherein the cross section of each of the coils has a plurality of cross sections of the lead wire where the cross sections are layered in stacked barrel form.
9. The stator according to claim 1, wherein the annular coating portion has an engaging portion which extends in the radial direction;
   wherein the engaging portion is the bottom surface and the side surfaces of the notch.
10. The stator according to claim 9, further comprising an engaging protrusion which protrudes from the annular coating portion in the radial direction to which the connecting wire is engaged.
11. The stator according to claim 1, wherein the notch is a first notch, the bottom surface is a first bottom surface, and the side surfaces are first side surfaces,
    wherein the extension portion further has a second notch which extends from the distal end toward the proximal end; a second bottom surface and second side surfaces for defining the second notch; and a radially outer surface,
    wherein the connecting wire is arranged so as to extend from the first tooth, be positioned by the first bottom surface and the first side surfaces, and thus, be led outward from the inside in the radial direction of the extension portion and run along the radially outer surface in order to be directed to the second tooth, and is positioned by the second bottom surface and the second side surfaces, and thus, is led inward from the outside in the radial direction of the extension portion.
12. The stator according to claim 11,
    wherein the annular coating portion has a first engaging portion and a second engaging portion which extend in the radial direction, wherein the first engaging portion is the first bottom surface and the first side surfaces of the first notch, and the second engaging portion is the second bottom surface and the second side surfaces of the second notch.
13. The stator according to claim 11, wherein the connecting wire is bent by the side wall to an angle which exceeds 90°, and thus, led inward from the second notch in the radial direction of the extension portion.
14. The stator according to claim 11, wherein the connecting wire is one of a plurality of connecting wires, and wherein all of the connecting wires which are led inward from the second notch in the radial direction of the extension portion are bent by the side wall to an angle which exceeds 90°.

15. The stator according to claim 11, wherein the connecting wire is one of a plurality of connecting wires which are layered along the radially outer surface in the axial direction.

16. The stator according to claim 11, wherein the stator core has a first end at which the extension portion is located in the axial direction and a second end on the side opposite to the first end, and wherein terminals of the connecting wires are arranged so as to run from the first end to the second end.

* * * * *